United States Patent [19]
Cornay

[11] Patent Number: 6,142,924
[45] Date of Patent: *Nov. 7, 2000

[54] CONCENTRIC TUBULAR CENTRIFUGE

[75] Inventor: Paul J. Cornay, Longmont, Colo.

[73] Assignee: Erth LLC, Boulder, Colo.

[*] Notice: This patent is subject to a terminal disclaimer.

[21] Appl. No.: 09/298,272

[22] Filed: Apr. 23, 1999

Related U.S. Application Data

[63] Continuation of application No. 08/950,377, Oct. 14, 1997, Pat. No. 5,944,648
[60] Provisional application No. 60/028,556, Oct. 15, 1996.

[51] Int. Cl.[7] ............................. B04B 5/02; B04B 11/00
[52] U.S. Cl. ............................ 494/33; 494/37; 494/51
[58] Field of Search ................... 494/37, 22, 31, 494/33, 43, 44, 56, 50–55, 76–78, 84, 85; 210/294, 319, 322

[56] References Cited

U.S. PATENT DOCUMENTS

| | | |
|---|---|---|
| 680,270 | 8/1901 | Ohlsson . |
| 717,385 | 12/1902 | Gathmann . |
| 778,355 | 12/1904 | Freas . |
| 785,910 | 3/1905 | Nilsson . |
| 949,226 | 2/1910 | Goodman . |
| 949,227 | 2/1910 | Goodman . |
| 1,097,561 | 5/1914 | Resines . |
| 1,124,907 | 1/1915 | Jahn . |
| 1,190,829 | 7/1916 | Wendell . |
| 1,239,734 | 9/1917 | Sloan et al. . |
| 1,510,657 | 10/1924 | Coleman . |
| 1,564,665 | 12/1925 | Gates . |
| 1,742,096 | 12/1929 | Perrier . |

(List continued on next page.)

FOREIGN PATENT DOCUMENTS

| | | | |
|---|---|---|---|
| 189162 | 4/1964 | Sweden | ................................. 494/51 |
| 18147 | of 1907 | United Kingdom . | |
| 269193 | 4/1927 | United Kingdom . | |

OTHER PUBLICATIONS

CARR Separations, Inc.; CARR Powerfuge® Separation System, P6 Brochure; at least Jan. 14, 1997.
CARR Separations, Inc.; CARR Powerfuge® Separation System, P12 Brochure; at least Jan. 14, 1997.
CARR Separations, Inc.; CARR Powerfuge® Separation System, P18 Brochure; at least Jan. 14, 1997.
CARR Separations, Inc.; CARR Powerfuge® Separation System, Pilot for Hazardous Areas Brochure; at least Jan. 14, 1997.
CARR Separations, Inc.; CARR Introduces Powerfuge™ Brochure; at least Jan. 14, 1997.
CARR Separations, Inc.; Chemical Processing Brochure; Jan., 1998.
CARR Separations, Inc.; Sub–micron Classification and Recovery Brochure; at least Jan. 14, 1997.

*Primary Examiner*—Charles E. Cooley
*Attorney, Agent, or Firm*—Holland & Hart LLP

[57] ABSTRACT

A centrifuge for decanting lighter material from heavier material from a mixture of initial material includes a housing having a central body and a hollow arm extending from the body, the arm having a first end attached to the central body, and a second end extending away from the central body, and an end cap attached to the second end of the arm to form a chamber in the arm. A baffle is attached to the body and extends into the chamber, the baffle having a longer inner tube having an interior and a distal end, and a shorter outer tube. The longer tube is positioned inside the shorter tube and defines an inner space therebetween. An outer space is defined between the shorter tube and the hollow arm. An entrance path for the mixture of initial material is formed in the housing and communicates with the inner space. An exit path for the light material is formed in the housing and communicates with the outer space. An exit path for the heavier material is formed in the housing and includes the interior of the longer tube. A plug is formed in the chamber adjacent the end cap to engage the distal end of the longer tube and define a flow path to guide the lighter material to the light material exit path.

6 Claims, 17 Drawing Sheets

U.S. PATENT DOCUMENTS

| | | |
|---|---|---|
| 1,783,546 | 12/1930 | Petsche et al. . |
| 1,854,313 | 4/1932 | Petsche et al. . |
| 2,450,737 | 10/1948 | Rundquist . |
| 3,150,944 | 9/1964 | Nerad . |
| 3,623,656 | 11/1971 | Lavanchy . |
| 3,685,721 | 8/1972 | Kohama ................... 494/51 |
| 4,073,431 | 2/1978 | Jager . |
| 4,617,010 | 10/1986 | Epper et al. . |
| 5,156,751 | 10/1992 | Miller . |

CONCENTRIC TUBULAR CENTRIFUGE

CROSS-REFERENCES TO RELATED APPLICATIONS

This application is a continuation of U.S. application Ser. No. 08/950,377, filed Oct. 14, 1997, U.S. Pat. No. 5,944,648, which claims the benefit of U.S. Provisional Application Ser. No. 60/028,556, filed Oct. 15, 1996.

FIELD OF THE INVENTION

This invention relates to centrifuges.

BACKGROUND

Centrifuge technology has long been used for separating lighter material from heavier material from initial material consisting of a combination of the two. Centrifuge technology has been implemented in medical, industrial, and public service sectors in various specific applications where separation technology is beneficial.

The effectiveness of presently known centrifuge technology depends on the level of the separating force (centrifugal force) generated by the centrifuge and the residence time of the material under the separating force. Virtually all centrifuges rely on some type of rotary motion to generate the separating force, and thus the level of the separating force generated depends on the size (moment arm) of the centrifuge and the speed at which the centrifuge is rotated. To generate a given level of separating force, a small-scale centrifuge must be driven at a higher revolutions per minute than a large-scale centrifuge.

The residence time of the material under the separating force is dependent upon the flow-path of the material through the centrifuge. The flow-path is defined by the internal structure of the centrifuge, and is sometimes limited by the type of centrifuge. Typically, the higher the residence time of a material under a given separation force, the better the separation of the light material from the heavy material.

Existing centrifuge technology is limited in its ability to allow changes to the separation force and/or the residence time.

In addition, existing relatively large-scale centrifuge technology capable of handling relatively large inflow rates such as 100 G.P.M., is not conducive to portable use in a self-contained unit. The structures are difficult to transport, require frequent skilled maintenance, and often do not allow simple modification of the separation force or residence time to adjust to varying raw material conditions, or final material requirements.

It is with the foregoing issues that the centrifuge of the present invention was developed.

SUMMARY

The present invention in general terms concerns a centrifuge having opposing laterally extending arms with concentric tubular baffles therein defining a serpentine flow path. The centrifuge is rotatably mounted in a frame to allow easy transportation, and has an external drive interface for simple, reliable, and adjustable actuation of the centrifuge. The centrifuge is designed to allow for simple disassembly, maintenance, and repair as needed, and to allow for modifying the flow path to adjust (increase or decrease) the residence time of the material as desired.

One embodiment of the inventive centrifuge for decanting lighter material from heavier material from a mixture of initial material includes a housing having a central body and a hollow arm extending from the body, the arm having a first end attached to the central body, and a second end extending away from the central body, and an end cap attached to the second end of the arm to form a chamber in the arm. A baffle is attached to the body and extends into the chamber, the baffle having a longer inner tube having an interior and a distal end, and a shorter outer tube. The longer tube is positioned inside the shorter tube and defines an inner space therebetween. An outer space is defined between the shorter tube and the hollow arm. An entrance path for the mixture of initial material is formed in the housing and communicates with the inner space. An exit path for the light material is formed in the housing and communicates with the outer space. An exit path for the heavier material is formed in the housing and includes the interior of the longer tube. During operation the heavy material migrates outwardly and the lighter material migrates inwardly. A plug of the heavy material is formed in the chamber adjacent the end cap to engage the distal end of the longer tube and define a flow path to guide the lighter material to the light material exit path.

The baffle can have a plurality of longer and shorter concentrically-spaced tubes to define a serpentine flow path therebetween. The baffle can also be replaced to modify the flow-path through the centrifuge as desired. The exit path for the heavier material can include flighted conveyor screws to assist in moving the heavier material along the exit path to the heavy material outlet port. The conveyor screws can be actuated by the rotation of the centrifuge, and thus do not independently require an external drive means.

In another embodiment, a rotating centrifuge or decanting lighter material from heavier material from a mixture of initial material includes a housing having a central body, a baffle engaging the body, the baffle having a longer inner tube having an interior and a distal end, and a shorter outer tube, the longer tube positioned inside the shorter tube and defining an inner space therebetween. A hollow arm extends from the central body, the arm having a first end engaging the baffle, and a second end extending away from the central body. An end cap engages the second end of the arm to form a chamber in the arm, the end cap attached to the central body by a through-bolt extending from the end cap to the central body, and clamping the baffle and the hollow arm between the end cap and the central body. An outer space is defined between the shorter tube and the hollow arm, and an entrance path for the mixture of initial material is formed in the housing and communicates with the inner space. An exit path for the light material is formed in the housing and communicates with the outer space, and an exit path for the heavier material is formed in the housing and includes the interior of the longer tube.

Accordingly, it is an object of the present invention to provide a centrifuge that allows the flow path and separation force to be easily modified.

Other aspects, features and details of the present invention can be more completely understood by reference to the following detailed description of a preferred embodiment, in conjunction with the drawings, and from the appended claims.

DETAILED DESCRIPTION

Figure 1:
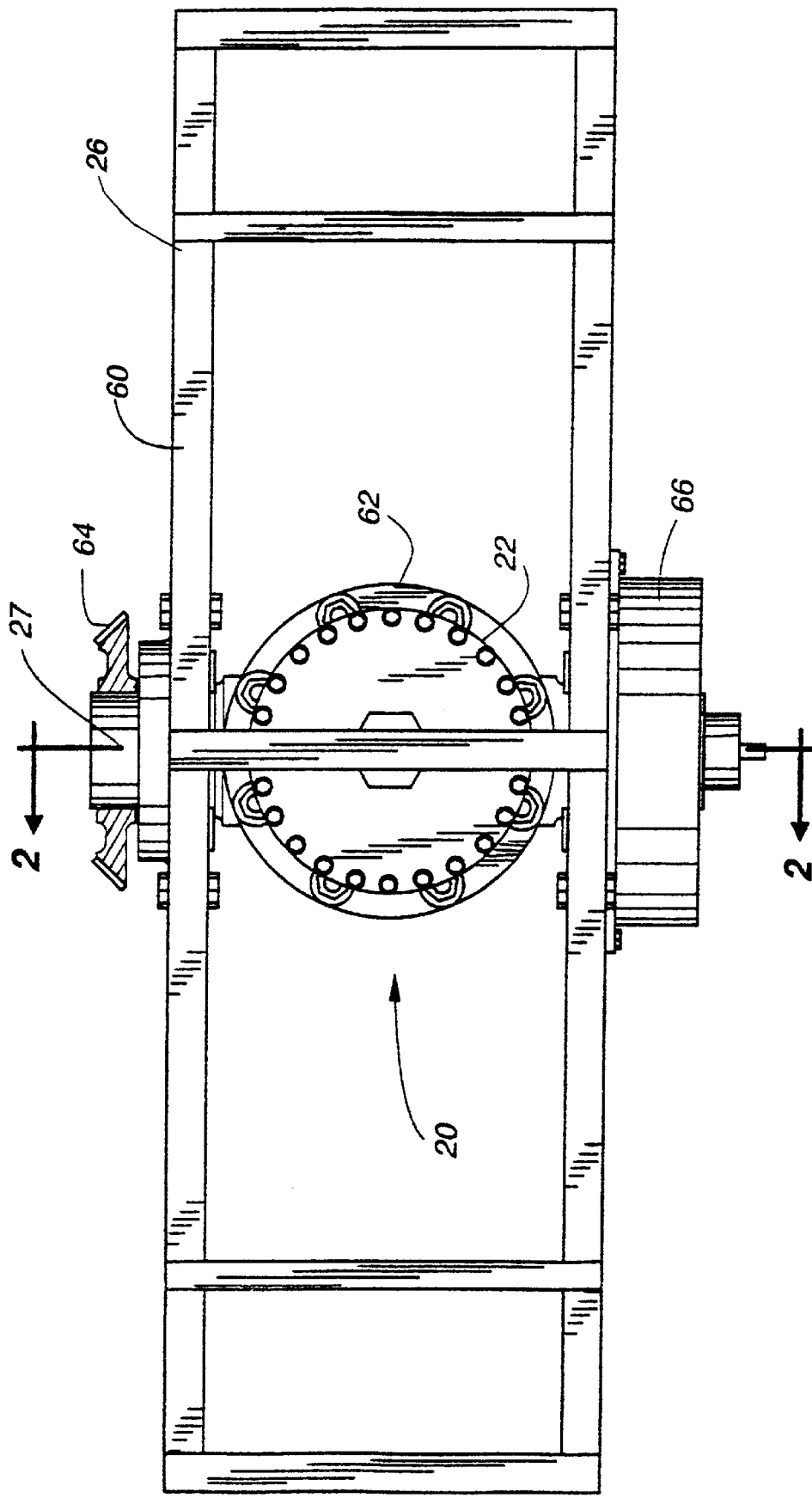
FIG. 1 is an elevation view of the centrifuge of the present invention.

A concentric tubular centrifuge 20, as shown and depicted in FIGS. 1–18, is designed to continuously separate large volumes of sludge, such as waste water and oil well drilling fluids. The centrifuge 20 is constructed of at least two laterally opposed, axially aligned arms 22 which extend perpendicularly outwardly from a vertical center main shaft 24 (FIG. 2). The main shaft and arms form a housing, which is supported by a frame 60. The centrifuge is driven by an external motor to rotate about a longitudinal or vertical axis 27 of the center main shaft which develops the centrifugal forces necessary for operation. The centrifuge preferably operates in the range of 600–2000 rpm, depending on its overall size.

Each arm 22 is identically constructed, and comprises a plurality of concentrically spaced tubes 28 (FIGS. 2, 3, 4, 8 and 13) with the tubes having alternating longer and shorter lengths. The alternating longer and shorter lengths make the distal ends 30 of each of the tubes alternatingly off-set. The center tube 32 is the smallest in diameter, and contains a conveyor screw 34 for removing the solids that build up at the distal end 36 of the arm during use. The conveyor screw moves the solids or heavier materials through the center tube 32 towards the center main shaft 24, where the solids are then moved down the center main shaft by another conveyor screw 38, for removal therefrom or deposit into a receptacle (not shown).

Still generally, the sludge enters the arms 22 from above through the center main shaft 24 while the centrifuge is rotating. The sludge immediately moves toward the distal ends 36 of each of the arms. The solids or heavier materials are removed from the liquid medium as the centrifuge is operated, as will be explained below.

As the sludge is forced to the distal ends 30 by the rotation of the arm about the center main shaft 24, the solid or heavier material 40 in the sludge compacts to form a plug 42 at the distal end (see FIG. 8), and the liquids 44 are forced to flow back toward the center main shaft. The defined flow path of the material is between the concentric tube walls, in a direction alternating first toward the distal end 30, then back toward the center main shaft 24, repeating this serpentine flow path pattern as required by the particular structure. As the sludge winds its way through the serpentine path, the solids 40 are removed from the sludge, and the liquid 44 is decanted and drained through an exit pathway 46 for liquids.

More particularly, at the distal end 36 of each arm, the ends of the longer tubes extend beyond the ends of the shorter tubes. As solids 40 are deposited at the distal end of the arm, the plug 42 is formed and increases in thickness until the plug 42 seals the ends of the longer tubes. The plug thickness does not increase enough to seal off the ends of the shorter tubes, and thus thereby partially defines the boundary of the serpentine flow path.

The thickness of the plug is regulated in part by the action of the conveyor screw 34, which removes the solid deposits. The conveyor screw shaft 48 preferably does not have flighting (threading) along its entire length, it only has flighting adjacent to either end. The flighting at the distal end 50 of the screw shaft is to help transfer the plug into the center tube. The centrifugal forces on the solids in the distal end of the arm combined with the hydrostatic head of the overlying liquids and solids assist in forcing the solids through the center tube 32 towards the center main shaft 24. The distance the solids move through the center tube depends on the operating parameters of the centrifuge (moment arm, rpms), and on the type of sludge being input to the system. The solids require the assistance of the flighting on the screw arm 34 to move further along an exit path 52 for solids to leave the structure.

The thickness of the plug is determined by the equilibrium established by the growth of the plug and the removal of the material forming the plug through the solids exit path 52. Basically, the amount of flighting 54 adjacent the end of the screw arm 34 near the center shaft helps determine the plug level. Assuming an input sludge having a relatively constant proportion of heavy and light materials, more flighting 54 along the screw arm length extending from the center shaft reduces the plug level. Less flighting 54 along the screw arm length extending from the center shaft increases the plug level. This relationship is due to the effect the flighting has on the removal of the heavier material.

The plug level must be kept at least at a minimum thickness to insure that it contacts the ends 30 of the longer tubes on the baffle 56 to help define the flow path (as described further below). This level should be relatively conservatively designed to accommodate for a temporary reduction in heavier material in the input sludge (which would cause the plug to grow more slowly). If the heavier and lighter material composition of the input sludge is to be changed for more than a temporary period, such as if a different type of sludge is to be treated, the length of flighting on the screw arm 34 may require modification also to accommodate the change in input sludge.

The invention is described herein using solids and liquids for simplicity of example. However, the invention can be used with heavy and light liquids, such as oil and water. The input material can be filtered prior to being introduced to the centrifuge if desired.

The input of the sludge material can be by gravity feed or by pumping. The centrifuge of the present invention is relatively insensitive to in-flow rate, solid content of the sludge, and weight of the sludge.

Figure 2:
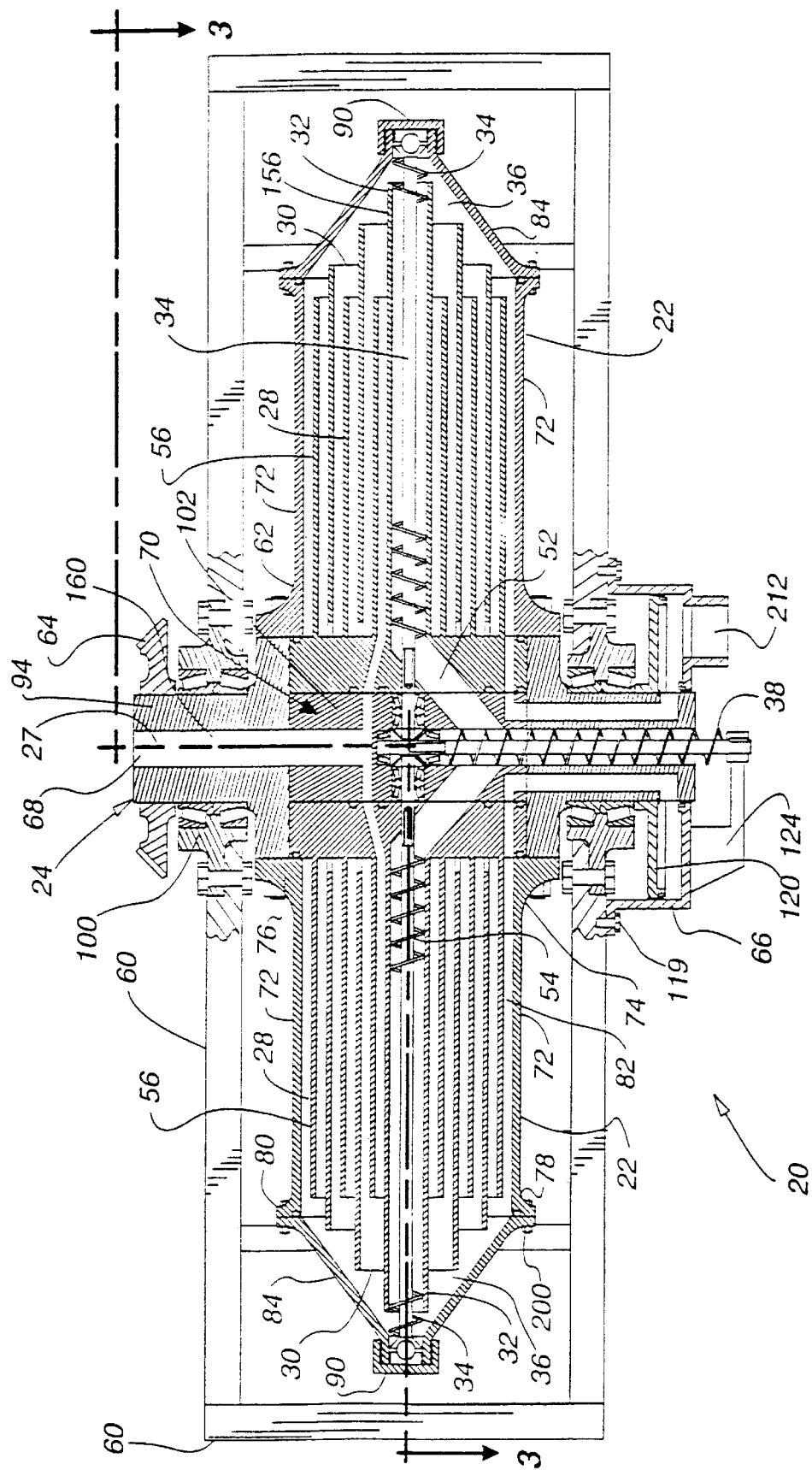
FIG. 2 is a section taken along line 2—2 of FIG. 1.
Figure 3:
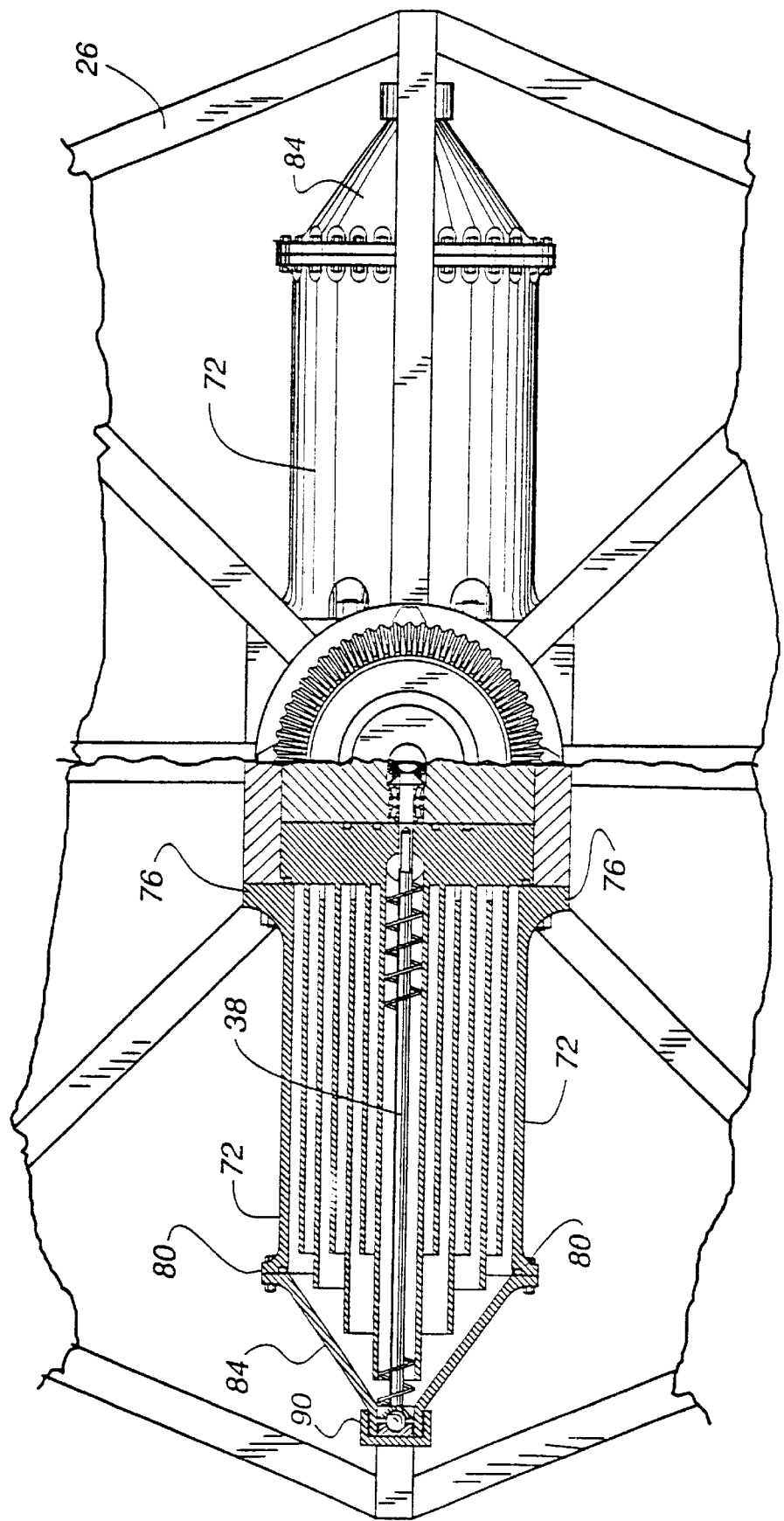
FIG. 3 is a section taken along line 3—3 of FIG. 2.

In greater detail, the concentric tubular centrifuge 20 of the present invention is shown in FIG. 1. A frame 60 supports the centrifuge of the present invention for rotational movement of the centrifuge about a vertical axis 27. The centrifuge comprises a housing 62 journaled in the frame with a drive means 64, such as a beveled ring gear drive, attached to the top of the housing for engagement with a drive motor of any known type. The bottom end of the housing is also journaled in the frame for rotational movement, with the bottom end of the housing being surrounded by a decanted fluid catch basin 66 defining a fluid outlet, as further described below. A drive motor (not shown) is positioned in engagement with the drive means 64, in this case the beveled ring gear drive, to engage the drive means to rotate the housing 62 about the vertical axis. In the configuration shown in FIG. 1, the housing rotates about the vertical axis 27 with the arms 22 moving into and out from the plane of the figure.

Referring now to FIG. 2, the centrifuge housing 62 comprises the center main shaft 24 (FIGS. 2, 7 and 11) having an axially oriented cylindrical bore 82 formed therethrough along with a large centrally positioned cylindrical chamber 70. Also included in the housing are laterally extending arm housings 72 (FIGS. 2, 3, 4, 7 and 8), which have a cylindrical shape with a first open end 74 attached by an annular flange 76 to the center main shaft 24, and a distal or second open end 78. The second open end defines an outwardly extending annular flange 80. Each arm housing 72 defines a cylindrical cavity 82. A frustoconically-shaped end cone 84 is removably attached to the flange 80 at the distal end of each of the arm housings to form an internal chamber in conjunction with the arm housing. An externally threaded aperture 86 (FIG. 4) is formed at the apex 88, or frustrum, of the end cone 84, and receives a correspondingly internally threaded cap end 90 for releasable attachment thereto.

Figure 11:
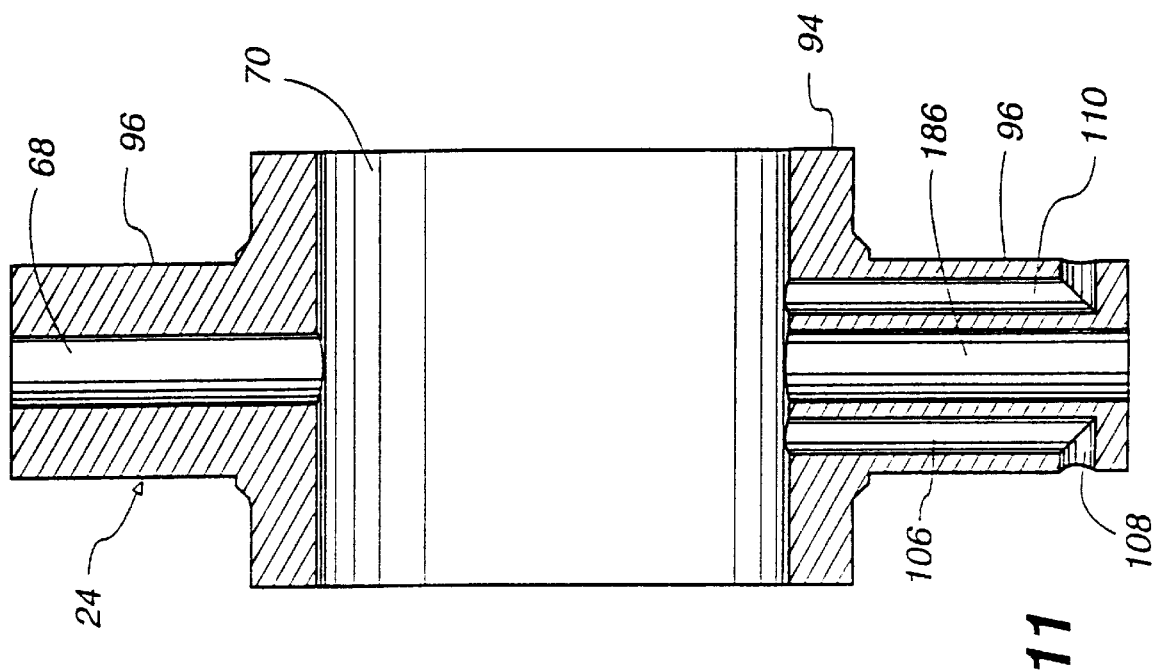
FIG. 11 is a representative section of the main center shaft.

Still referring to FIG. 2, and in addition to FIG. 11, the center main shaft 24 is preferably a unitary metal body having a central laterally extending cylindrical body portion 94 with opposing top and bottom cylindrical extensions 96. The axially oriented cylindrical bore 68 is formed through the top and bottom cylindrical portions of the center main shaft and communicates with the centrally located chamber 70.

The drive means 64, in this case a beveled ring gear drive, mounts around the upper end of the top cylindrical portion of the center main shaft 24. An upper portion of the frame 60 rotationally engages the top cylindrical portion of the center main shaft by way of a bearing means 100, such as tapered roller bearings, to facilitate the rotation of the housing 62 within the frame 60. A similar bearing construction is utilized to rotationally attach a lower portion of the frame to the bottom cylindrical portion of the center main shaft. The centrally positioned chamber 70 (FIG. 11) of the center main shaft 24 receives the fluid and solid transfer manifold 102 (FIG. 10), which is described in greater detail below.

As shown in FIG. 11, a channel 106 is formed through the bottom cylindrical portion of the center main shaft 24, which communicates with the centrally positioned chamber 70, and forms a radially extending aperture 108 adjacent the bottom end of the bottom cylindrical portion. A second identical channel 110 is formed in the bottom cylindrical extension opposite the first channel. These two channels form part of the decanted liquid exit path 46, as will be described below.

Figure 8:
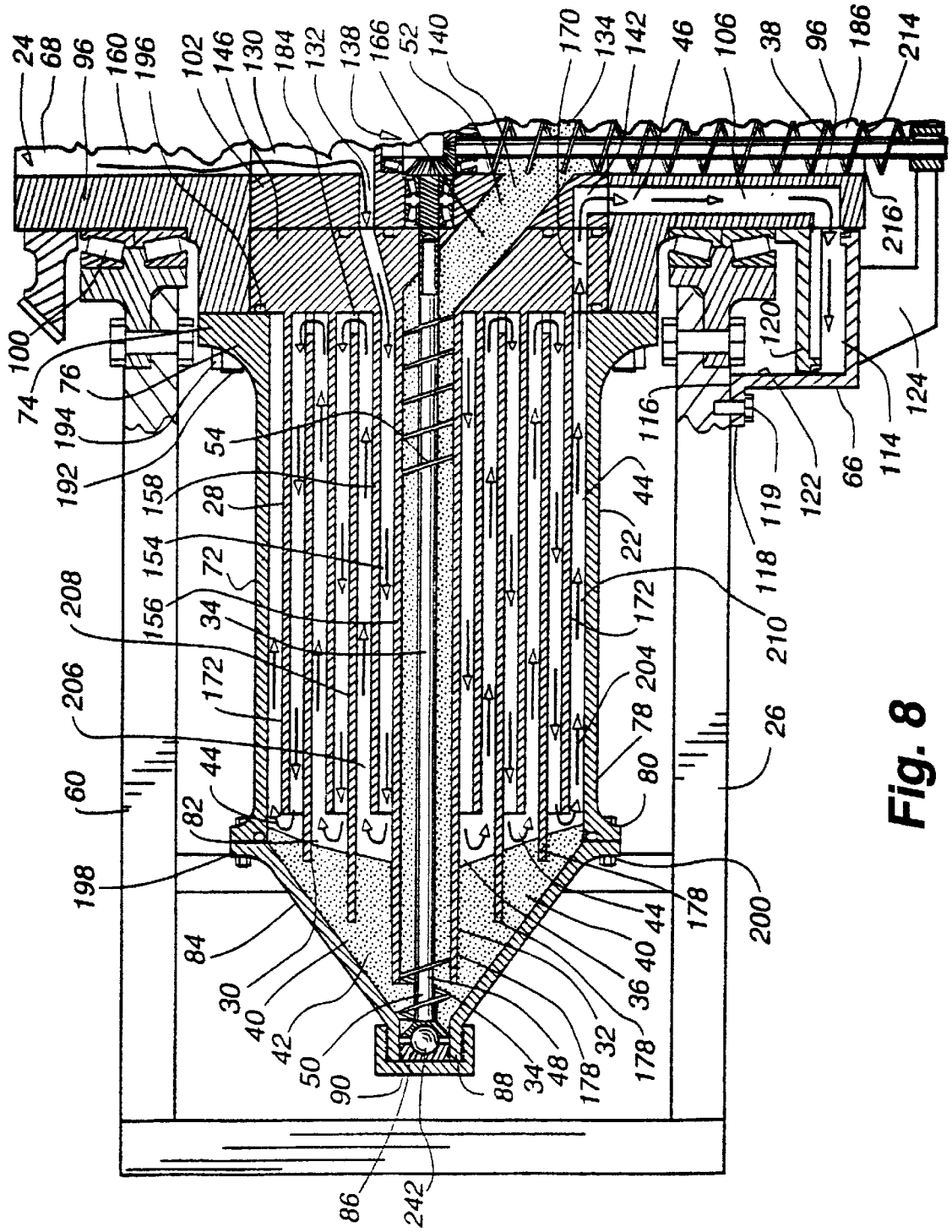
FIG. 8 is a section similar to FIG. 4, showing the various flow paths through the centrifuge arm.

Referring to FIGS. 2 and 8, a catch basin 66, which acts as a decanted fluid reservoir and drain channel, attaches to the frame 60 and forms an annular fluid collector about the bottom cylindrical extension 96. The catch basin sealingly engages the bottom cylindrical extension adjacent to and below the apertures forming the channel. A fluid outlet port 114 is formed in the floor of the catch basin to allow drainage of the decanted fluid. The catch basin has a circular tub shape defining a rim 116, from which extends an annular flange 118. The catch basin is attached to the frame by any known means, such as bolts 119 attached through the flange to the frame. A catch basin lid 120 is attached in fixed engagement with the bottom cylindrical portion of the center main shaft and defines a perimeter which sealingly engages the side walls 122 of the catch basin. As the centrifuge rotates within the frame about its vertical axis, the catch basin remains stationary while the bottom cylindrical portion of the center main shaft rotates, and while the catch basin lid 120 also rotates in sealing engagement with the walls 122 of the catch basin.

A main conveyor screw bracket 124 is fixed to the bottom of the catch basin and extends to a central position aligned with the axial bore formed through the center main shaft 24, and receives an end of the main conveyor screw 38, which is described below.

Figure 10:
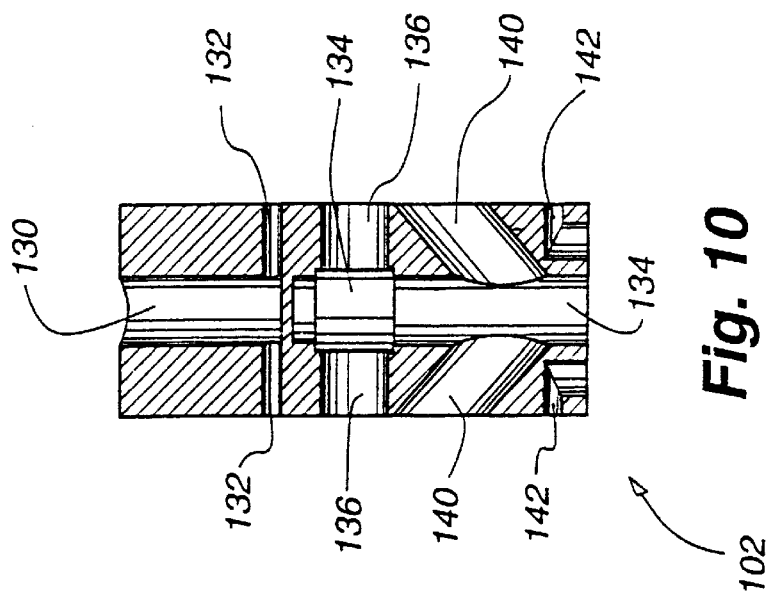
FIG. 10 is a representative section of the manifold.
Figure 12:
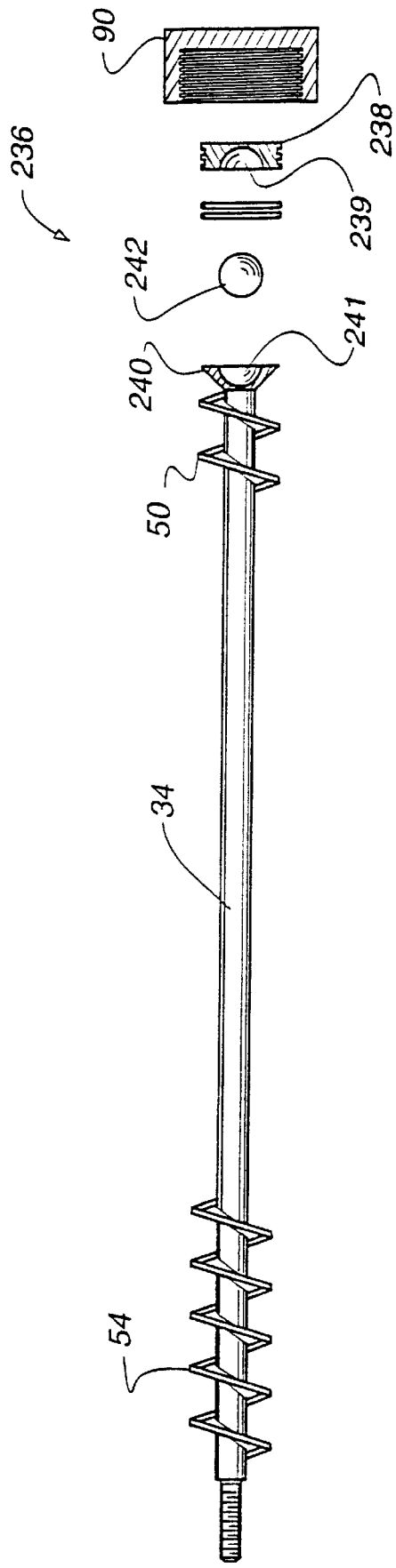
FIG. 12 is an exploded view and partial section of one conveyor screw.
Figure 13:
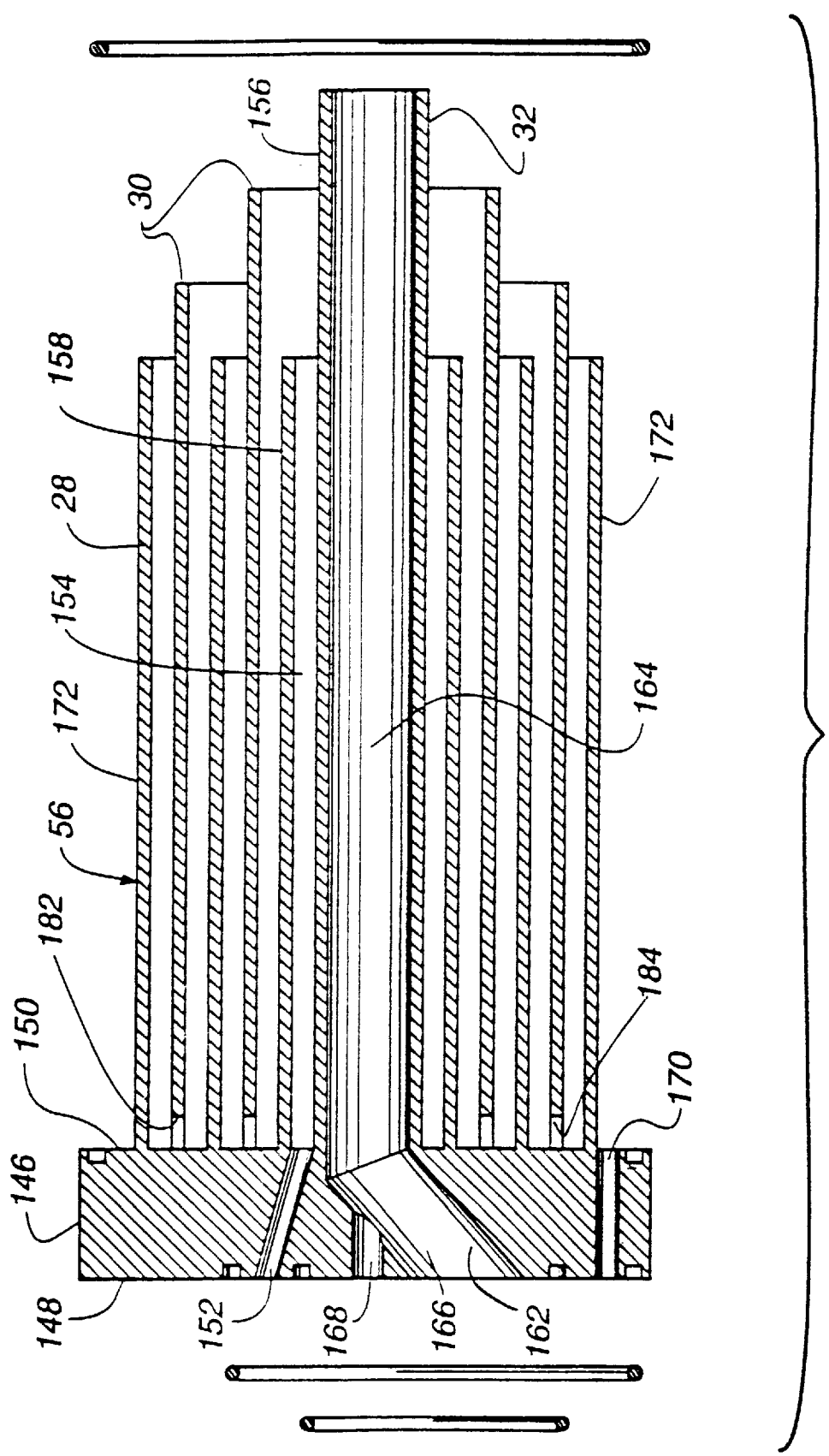
FIG. 13 is a representative section of a baffle and associated seals.

Referring to FIGS. 2 and 10, the fluid and solid transfer manifold 102 is shown. The fluid and solid transfer manifold has a cylindrical main body which is sized to fit in the central cylindrically shaped chamber 70 of the center main shaft 24 (FIG. 11). The fluid transfer manifold 102 defines a first axial bore 130 formed through a top portion of the manifold and terminates therein. Opposing and laterally extending side bores 132 are formed in communication with the first axial central bore 130, the side bores extending through opposing side walls to act in fluid communication with the arm housing, as is described in further detail below. The first axial bore 130 and associated side bores 132 form a portion of the incoming flow path.

Figure 4:
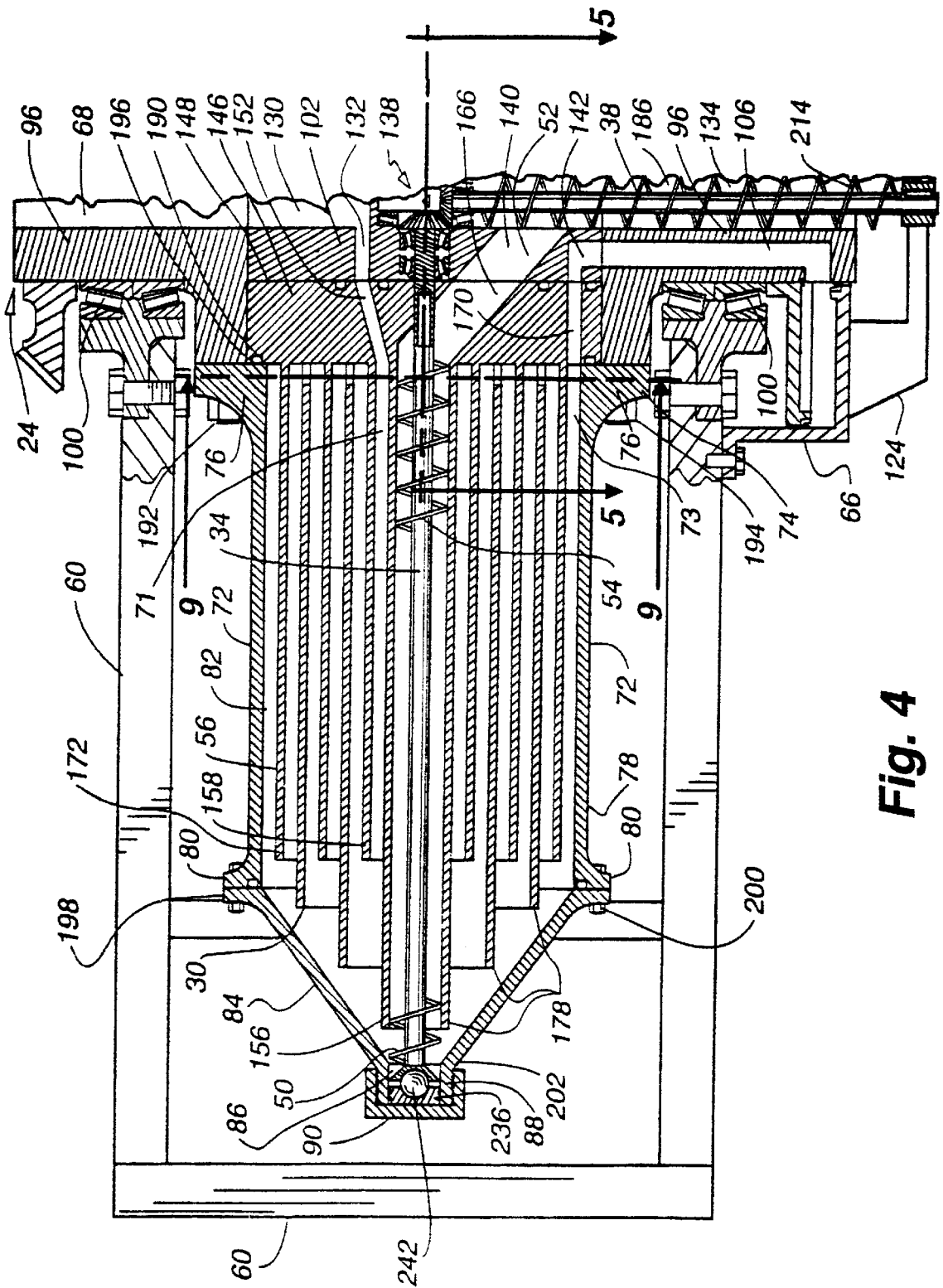
FIG. 4 is an enlarged partial section of the left arm of the centrifuge as shown in FIG. 3.
Figure 5:
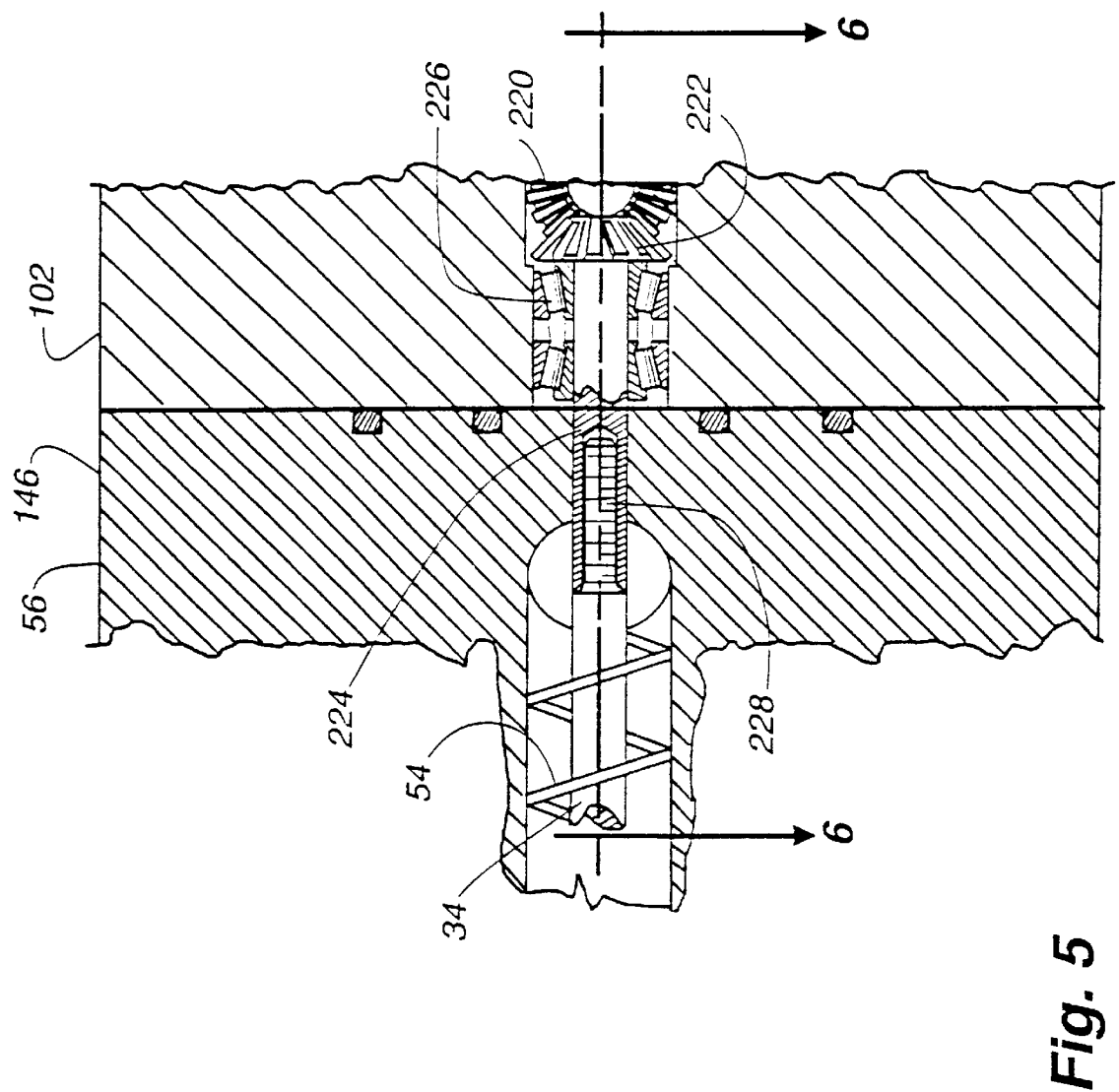
FIG. 5 is an enlarged section of the intersection of the conveyor rod and gear box of the centrifuge as shown in FIG. 4.

A second axially aligned central bore 134 extends from the bottom surface of the manifold 102 through the central portion of the manifold and terminates prior to joining with the first central bore 130 described above. The top end of the second axial bore 134 communicates with opposing laterally extending bores 136 for receiving a motion transfer means 138 (FIG. 4). The motion transfer means can be a gear and bearing box used to drive the conveyor screw arms 34 off of the main conveyor screw arm 38, as is described in greater detail below. A pair of angled bores 140 are formed each through a side wall of the manifold and extend at an angle downwardly to communicate with the second axial bore 134. The angled bores 140 form a portion of the solids or heavier material exit flow path 52, as described below. A pair of drain channels 142 have an L-shape, with each channel extending from the side wall to the bottom wall of the manifold 102, and form a portion of the decanted fluid exit path 106 for use in draining the decanted liquid from the arm housings 72, as is described in greater detail below. Other entrance, drain and exit channel configurations can be utilized depending on the structure of the device.

Referring to FIGS. 2, 3, 4, 8 and 13, a baffle 56, one of which extends laterally from each side of the manifold 102, is partially inserted into the centrally positioned chamber 70 in the center main shaft 24 whereby the baffle 56 defines an inner radial location 71 and an outer radial location 73 in the chamber 70. Each baffle 56 includes a base 146 having a first side surface 148 and a second side surface 150, and a plurality of concentric cylindrical tubes 28 attached to the second side surface 150 and extending perpendicularly therefrom. The cylindrical tubes have varying lengths and are positioned to alternate between long and short tubes in their concentric configuration. Preferably, the shortest tubes are all of equal length, with tubes of ever-increasing length being alternately positioned between the shortest tubes with the length of the tubes increasing from the largest diameter tube to the smallest diameter tube. With specific reference to the embodiment shown in FIG. 13, six tubes are used to form the preferred embodiment. It is contemplated that a different number of tubes can be utilized depending on the desired structural and performance characteristics. Three of the tubes, the shorter tubes, are all of equal length, while the other tubes increase in length as their diameter decreases. The concentric tubes are spaced apart a predetermined distance to allow sufficient fluid flow through the flow path defined by the tubes, described in greater detail below. Preferably, the spacing is approximately 0.5 inches, and the lengths between the tubes can be any of a variety of offset dimensions as desired.

A first channel 152 is formed through the base member 146 from the second side 150 to the first side 148, and communicates with the gap 154 formed between the innermost tube 156 and the adjacent second innermost tube 158. This channel 152 forms a part of the incoming flow path 160. A forked channel 162 is formed through the base 146 and communicates with the longitudinal channel 164 defined by the innermost tube 156, with one fork 166 oriented at an angle downwardly, and the other fork 168 extending in an axial orientation through the base member. A third channel 170 is formed through the base member to open in the space between the outermost tube 172 and the arm housing 72 (FIG. 4).

Figure 9:
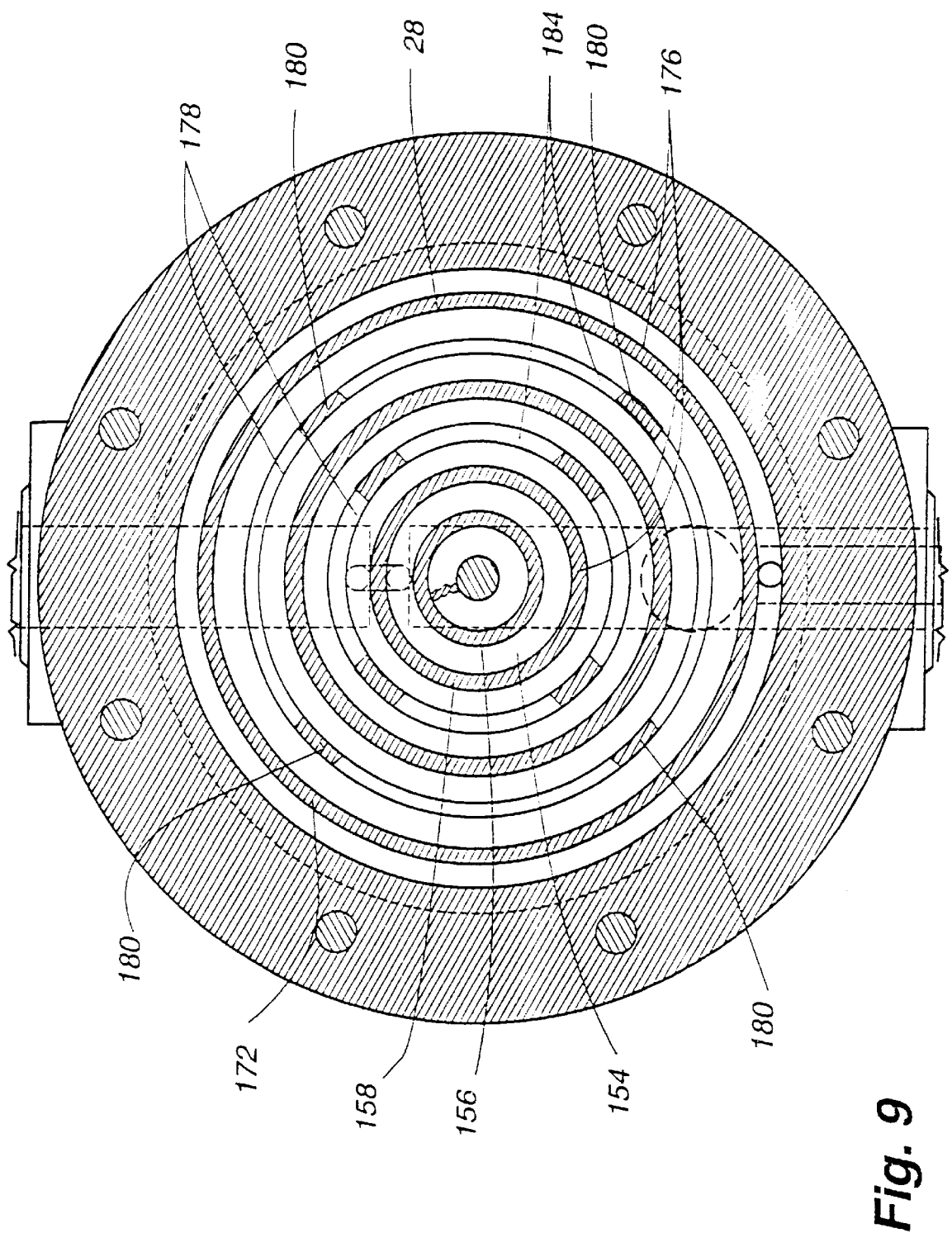
FIG. 9 is a section taken along line 9—9 of FIG. 4.

The concentric tubes 28 are attached to the base member 146. Referring to FIG. 9, the shortest tubes 176 alternating between the longer tubes 178 are sealed about the entire circumference of the end attached to the base member 146 in a fluid-tight manner. The alternately positioned longer tubes 178 are attached to the base member in discrete positions 180 along the circumference of the end 182 adjacent to the base member, such as at every 90 degree increment as shown in FIG. 9. The gap 184 formed between the majority of the circumference of the end of the tube attached to the base member allows fluid to flow from the inside of the tube to the outside of the tube, as is necessary for the serpentine flow path, which is explained in greater detail below.

The base member 146 has a circular shape defining a circumference which is concentrically spaced from the outermost tube 172 of the baffle 56. The base member is positioned in the central chamber 70 of the center main shaft 24 such that the first side 148 of the base member is adjacent to and engages the corresponding side of the fluid transfer manifold 102, as shown in FIG. 4. The baffle member is held in this position by a clamping force provided by the attachment of the arm housing 72 to the center main shaft 24.

Figure 6:
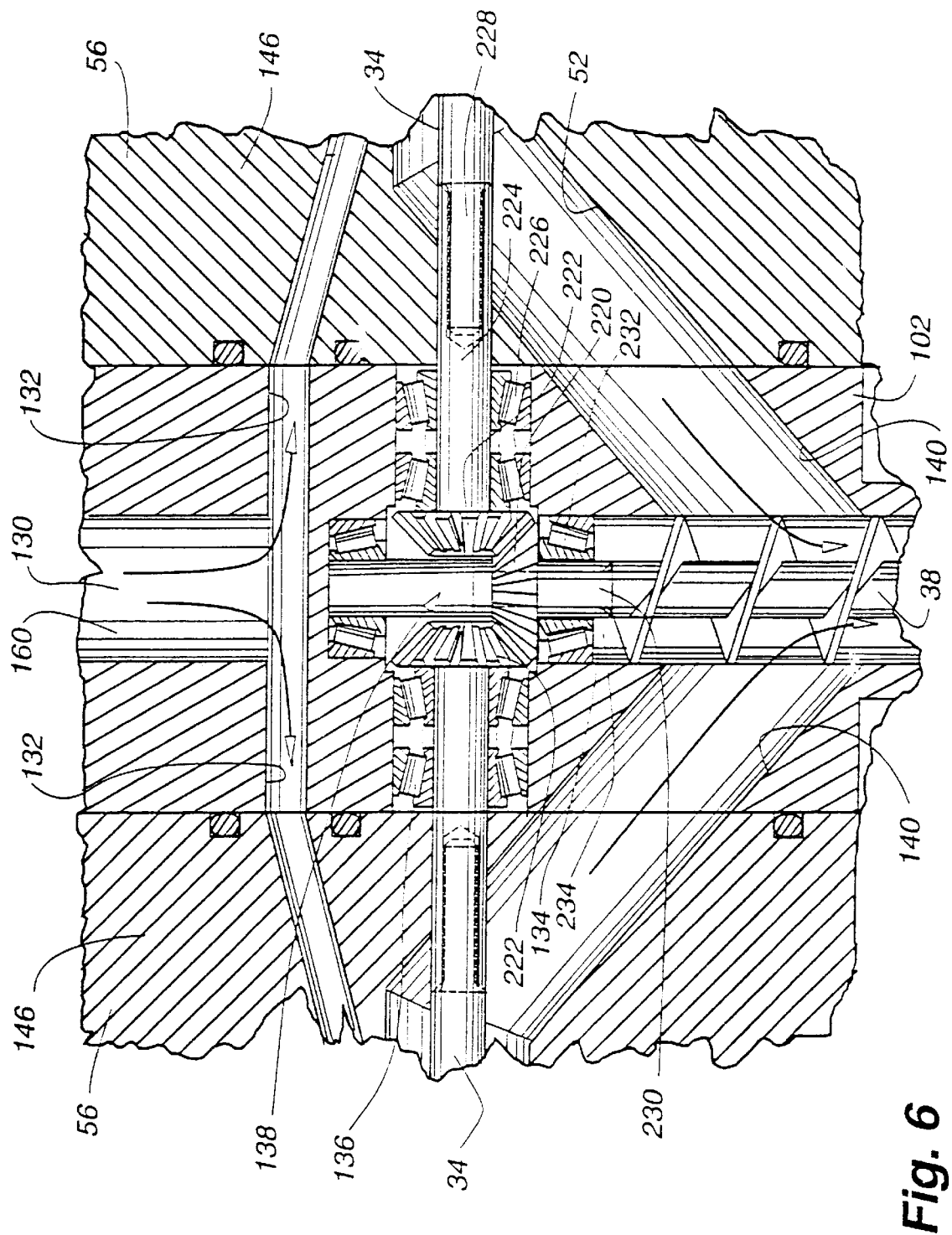
FIG. 6 is an enlarged section of the central portion of the centrifuge as shown in FIG. 2.
Figure 7:
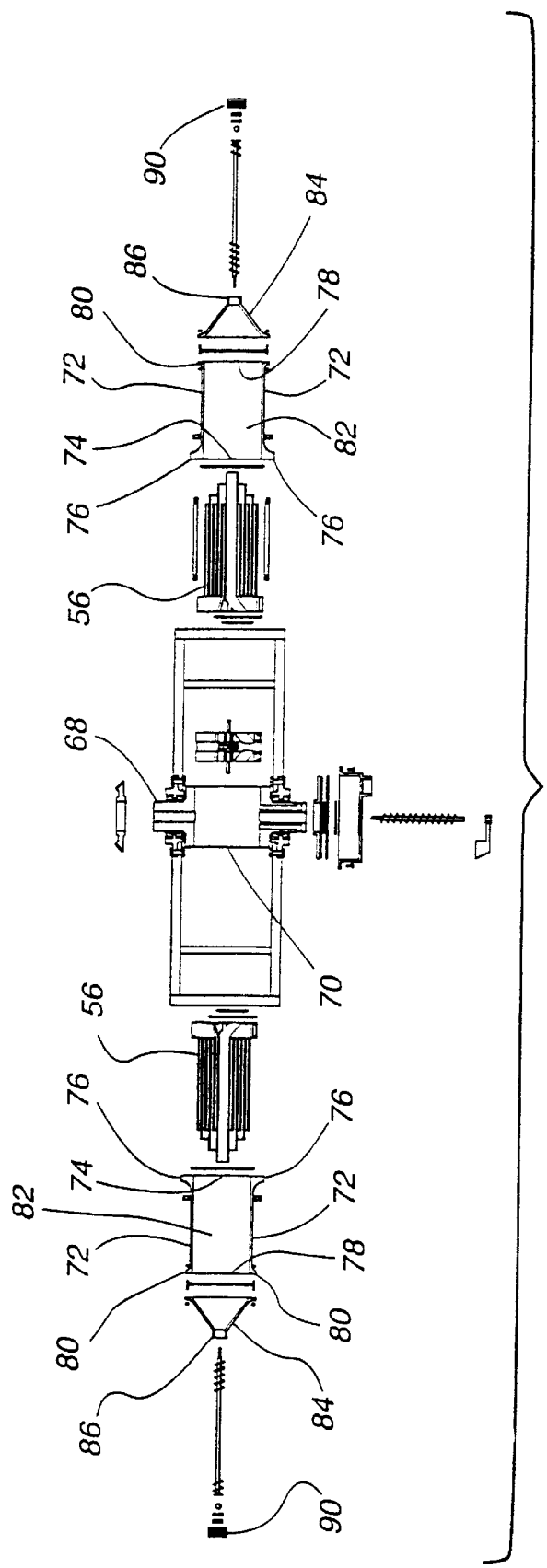
FIG. 7 is an exploded view of the centrifuge.

As shown in FIGS. 2 and 4, the first channel 152 formed through the base member communicating with the space between the innermost 156 and second innermost tube 158 is aligned with the radially extending channel 132 formed in the manifold, which in turn communicates with the first axial bore 132 formed in the manifold, and continues in communication with the axial bore 68 in the upper cylindrical extension 96 of the center main shaft 24. This series of channels form the incoming flow path 160 (FIG. 6). The interfaces between the base member 146, manifold 102 and the center main shaft 24 are sealed, such as by O-ring seals, to isolate the incoming flow channel and avoid leakage along the interfaces.

The angled bore 166 in the base member 146 is aligned and fluidly communicates with the angled bore 140 of the manifold 102, and continues in fluid communication with the second central bore 134 formed in the manifold, which is in turn aligned with the axial bore 186 through the lower cylindrical extension 96 of the center main shaft 24. The channel 168 located in an axial position with respect to the innermost tube is aligned with the channel 136 which houses the transfer means in the manifold, which in turn is in alignment with the second centered bore 134 of the manifold and the axial bore 186 through the lower cylindrical extension 96. This series of channels forms the heavier material exit path 52 (see FIG. 6).

The channel 170 formed through the bottom of the base member 146 outside the outermost tube 172 is aligned with the L-shaped channel 142 formed in the manifold, which is in turn aligned with the channel 106 formed in the lower cylindrical extension 96 of the center main shaft 24. This series of channels forms the decanted liquid drain channel 46 emptying into the basin 66 (FIG. 8). The channels and bores aligned between and communicating through the base member, manifold and main shaft, are separated by seals, such as O-rings, at the interface between the members to isolate the flow and avoid leakage along the interface.

The manifold 102, baffles 56 and arm housings 72 are mounted on the main shaft 24. The arm housing is shown in FIGS. 2, 3, 4 and 8. When assembled, the flange 76 at the first end meets with the annular shoulder formed around the central chamber 70 of the center main shaft 24, in addition to a circumferencial portion 190 of the base member of the baffle. Elongated bolts 192 having opposing threaded ends are positioned through continuous bores formed in the flange 76 at the first end 74 of the arm housing 72, through the center main shaft 24, and through the opposing and identical flange 76 of the second arm housing. Nuts 194 are threaded and engaged to the opposite ends of the elongated bolt 192 to firmly and releasably clamp the arm housing to the center main shaft 24, which clamps the manifold 102 between the opposing base members 146 positioned on either side of the manifold in the central chamber 70 of the center main shaft. The engagement of the flange 76 at the first end 74 of the arm housing 72 and the circumferencial band 190 of the base member 146 of the baffle member 56 is hermetically sealed by an O-ring 196. A plurality of bolts 192 are positioned through the flange 76 at the first end of the arm housing 72 and through the center main shaft 24 to affix the arm housing to the center main shaft and clamp the base members 146 of the baffles and manifold in the proper position. The baffles 56, manifolds 102 and arm housings 72 are able to be removed from the main shaft 24 simply by removing the bolts 192 in the flanges 76 of the arm housings 72.

The longer of the concentric tubes 178 in the baffle member 56 extend past the second end 78 of the arm housing. The end cone 84, which has a laterally extending flange 198 formed about the circumference of the larger diameter end of the end cone, sealingly engages and is attached to the flange 80 formed at the second end 78 of the arm housing 72 by a plurality of fasteners 200, such as nuts and bolts positioned in an equally spaced arrangement around the flange. The end cone 84 acts to cover the ends of the longer tubes 178 and defines the end of chamber 82 in the centrifuge arm. The smaller diameter end 202 of the end cone defines external threads for receiving an internally threaded end cap 90.

The input, decanting, and output flow paths 160, 46, 52 respectively are hereafter defined to facilitate the description of the conveyor screws 34, 38. The material to be decanted, for instance sludge, is introduced into the centrifuge through the inlet channel 160 (incoming flow path) formed by the combination of the axial bore 68 through the top cylindrical portion 96 of the center main shaft 24, in communication with the top axial bore 130 in the manifold 102, in continued fluid communication with the laterally extending bores 132 through the side walls of the manifold and through the base members 146 of each baffle. The inlet channel 160 directs the incoming sludge to the gap 154 formed between the innermost tube 156 and the second innermost tube 158. The introduction of the sludge occurs while the centrifuge is rotating about its vertical axis 27, which places the sludge under the effects of centrifugal force, which then forces the sludge through the input channel 160 and into the gap 154 between the first and second tubes.

In steady state operation (i.e., where the centrifuge of the present invention is running at operating speed after any start-up period and the material to be decanted has been introduced into the centrifuge), a plug 42 of heavy material 40 is formed at the distal end 36 of the cavity 82 in each arm, and extends between and seals the ends of the longer concentric tubes 178 to form a structural member used in defining the flow path 204 of the fluid through the centrifuge. As shown in FIG. 8, as the sludge flows through the gap 154 between the first and second tubes, and passes the end of the shorter second tube 158, the fluid impacts the plug 42 and is forced into the gap 206 between the second and third tubes to flow back towards the center main shaft 24. As the fluid flows to the base of the third tube 208, it flows through the gap 184 between the third tube and the base member 146 of the baffle 56 and around into the gap between the third and fourth tubes, at which time the liquid then flows out towards the distal end of the baffle.

The fluid then flows past the shorter fourth tube and is diverted by the plug back between the fourth and fifth tubes to flow towards the base member once again due to the seal formed between the longer third and fifth tubes. Once again, as the sludge flows back to the center main shaft, the fluid flows through the gap between the base member and the fifth tube, and enters the space between the fifth tube and the sixth tube. The fluid is then forced to the distal end of the baffle, and is directed back towards the center main shaft as a result of the seal formed by the plug between the longer fifth tube and the arm housing. The fluid flows in the space 210 formed between the shorter sixth tube 172 and the arm housing 72 back towards the center main shaft. The heavier material 40 migrates to the distal end 78 of the housing, at all stages of the flow path, and deposits there to form the plug 42.

Since each of the concentric tubes 28 of the baffle member 56 are cylindrical in shape, the volume between the tubes is also cylindrical in shape (see FIGS. 8 and 9). The fluid and sludge can flow anywhere in the particular gap between adjacent tubes. The decanted fluid 44 flows into the fluid outlet channel 46 from anywhere in the volume between the sixth tube and the arm housing. The outlet channel 46 is formed by the channel 170 through the base member 146 of each baffle, through the L-shaped channel 142 in the manifold, and continuing through the fluid drain channel 106 formed in the lower cylindrical extension 96 of the center main shaft 24. The decanted fluid flows through the outlet channel 46 and into the catch basin 66. The decanted fluid then flows through the outlet 212 (FIG. 2) formed in the base of the catch basin 66 into another reservoir or the conduit for further processing (not shown).

The solids portion 40 of the sludge is removed through the output flow path 52 with the assistance of the conveyor screw system. As the sludge flows through the passage ways in the baffle, the solids (heavier material) are continuously forced to the distal end of the arm to become part of the plug 42 formed of the solid material. The plug forms along the wall of the end cone 84, and after it builds up to a particular thickness seals the ends 30 of the longer concentric tubes 178 to act as a structural member and barrier, and in part define the flow path of the material through the centrifuge. The compacted solids, or heavy materials, forming the plug are forced by the combination of centrifugal force and the hydrostatic head of the overlying liquids and solids to the apex 88 of the end cone 84 and into the center tube 156, and part of the way back towards the center main shaft 24, just as an incompressible liquid will seek the same elevation on both sides of a U-shaped tube when each side is exposed to equal pressure. The solids then flow to the center main shaft 24 through the center tube 156 to the outlet channel 52 for the solids.

The outlet channel 52 for the solids is formed by the angle bore 166 in the base member 146 of the baffle 56, in communication with the angle bore 140 formed through the manifold 102, which communicates with the second axial bore 134 formed in the lower end of the manifold, which in turn communicates with the axial bore 186 formed through the lower cylindrical extension 96 of the center main shaft 24. The exit channel 52 for the solids exits the center main shaft in a downwardly direction to facilitate easy handling of the solids.

To assist in moving the solids along the outlet channel, a conveyor screw system is utilized. Referring to FIGS. 2 and 4, the conveyor system includes an arm conveyor screw 34 in each centrifuge arm, and a main conveyor screw 38 in the main shaft 24. The arm conveyor screw is positioned through the innermost tube 156 with flighting positioned at the distal end 50 and at the end 54 proximate the base member of the baffle. There is preferably no flighting along the majority of the length of each arm conveyor screw 34. The flighting need not be tightly toleranced to the dimension of the inner tube 156. The arm conveyor screw 34 is actuated by the movement of the centrifuge rotating about the vertical axis 27, as described further below, to move the sludge towards the center main shaft 24. The solids are forced through the angle portion of the exit path 52 by the positive pressure on the solids from the flighting of the arm conveyor screw 34, and the vacuum pressure created by the movement of the solids along the main shaft conveyor screw 38. The plug 42 is maintained by an equilibrium process as described above.

The length of the conveyor screw 34 where there is no flighting may define radially extending pegs to break-up the solid material as it flows along the exit path 52. The pegs can extend in any pattern along the length of the screw 34 where there is no flighting.

The vertically oriented main conveyor screw 38 is positioned in the axial bore 142, 186 formed through the center main shaft 24 in conjunction with the manifold 102. The main conveyor screw 38 is actuated by the movement of the rotation of the centrifuge about its vertical axis 27, and the rotation of the flighting 214 with respect to the main shaft 24 draws the sludge material downwardly to the exit port 216.

The main conveyor arm 38 is activated with respect to the centrifuge by the rotation of the centrifuge. A conveyor screw bracket 124 extends from the base of the catch basin 66 and is attached to the end of the main conveyor screw 38. The main conveyor screw 38 has flighting 214 along its entire length. The main conveyor screw 38 is fixed in position to the frame 26 and does not rotate with respect to the frame. The main conveyor screw 38 is made to move relative to the centrifuge 20 due to the rotation of the centrifuge about its vertical axis 27. The conveyor screw bracket 124 holds the end of the main conveyor screw 38 such that when the centrifuge 20 rotates about its vertical axis, the flighting 214 on the main conveyor screw causes the solids 40 in the exit channel 52 to be forced downwardly towards the exit portal 216. Alternatively, an additional drive system can be connected to the main conveyor screw 38 to drive the main conveyor screw and arm screws 34 independently of the movement of the centrifuge 20.

The arm conveyor screws 34 are driven from the main conveyor screw 38 by the transfer means 138, such as the gear box, as shown in FIGS. 2, 3, 4, 5, and 6. The gear box includes a master beveled gear 220 and two slave beveled gears 222, one slave gear 222 being associated with each arm conveyor screw 34. Preferably, the top of the main conveyor screw 38 defines the master beveled gear. The rotation of the master beveled gear 218 about the vertical axis 27 translates into rotation about the horizontal axis of each of the slave beveled gears 222. The slave beveled gears 222 are each attached to a shank 224 supported by a journal bearing 226 in the gear box to extend laterally outwardly. The outer end of each of the shanks defines a recess 228 for releasably receiving the inner ends of the arm conveyor screws 34 in a torque transferring manner, such as by interlocking spline teeth. The master gear 220 is attached to a shank 230 supported by journal bearings 232 in the gear box, and which extends vertically downwardly. The outer end of the master shank 230 forms a recess 234 for releasably receiving the top end of the main conveyor screw 38 in a torque-transferring relationship, such as by interlocking spline teeth.

The rotation of the centrifuge about its vertical axis results in the relative rotation of the master beveled gear 220 about its vertical axis, which in turn results in the rotation of the slave beveled gears 222 about their horizontal axis, which through the shank 224 and attachment with the arm conveyor screws 34 results in the rotation of the arm conveyor screws about their horizontal (and longitudinal) axis. The faster the centrifuge 20 is driven about its vertical axis, the faster the conveyor screws 34 are caused to rotate and move the sludge through the exit channel.

The outer ends of each of the conveyor arm screws 34 are supported by a bearing 236. The bearing 236 comprises a thrust plate 238 positioned in the outer end of the end cone 84 against the cap 90, the thrust plate 238 having a semi-spherical indentation 239. The outer end of the arm conveyor screw 34 forms a semi-spherical cup 240, and a ceramic ball 242 is positioned to be received in the semi-spherical indentation 239 in the thrust plate as well as the semi-spherical indentation 241 in the cup 240 formed at the outer end of the arm conveyor screw 34. As the conveyor arm 34 rotates, the bearing 236 supports the end of each arm 34 and allows it to rotate while minimizing wear. A conveyor screw 34 is shown in exploded view in FIG. 12.

The frame 26 supports the centrifuge 20 of the present invention to allow the rotation of the centrifuge about its vertical axis. The frame also facilitates handling the centrifuge to move it from place to place, as well as providing a basic safety function in keeping items away from the rotating housing.

The centrifuge as described above can be easily disassembled and maintained due to its straightforward assembly. This allows for ease of cleaning, routine maintenance and repair.

The centrifuge 20 structure of the present invention is also easily assembled and disassembled for replacing worn parts as well as modifying the length of the baffles 56 as desired. The arm conveyor screws 34 can be removed by simply removing the end cap 90 from the end cones 84, removing the thrust plate 238 (see FIG. 12) and extracting the conveyor screw 34 from the center tube 32. The inner end of the arm conveyor screw 34 will disengage from the cavity 228 (see FIG. 5) formed in the shank 224 of the gear box since the cavity (recess) in the shank is designed to transmit torsional forces only, and is not designed to restrain the arm conveyor screw 34 from axial or longitudinally outward movement. The main conveyor screw 38 can similarly be removed by disconnecting the conveyor screw bracket 124 and extracting the main conveyor screw 38 from the gear box in a similar manner. The baffles 56 can be removed or replaced by disconnecting the arm housing 72 from the center main shaft 24, which allows the baffles 56 to simply be extracted from the centrally positioned cavity 70 of the center main shaft 24. The baffle 56 can then be changed to include more or fewer tubes 28 depending on the desired residence time of the sludge under the centrifugal forces, and the level of decanting desired. The length of the centrifugal arms 22 can be adjusted to generate higher or lower separating forces for a given revolution rate. Alternatively, the revolution rate can be increased. A new or different baffle 56 can be repositioned therein with the arm housing 72 being remounted to the center main shaft 24 for further use.

The arm housing 72 should be made of a strong material, such as steel or other metal, to withstand the tension forces and internal pressures generated during operation. In addition, the bearing 236 at the end of each conveyor arm 34 can take a compressive load along the length of the conveyor arm 34 and still normally support the end of the conveyor arm, and allow the conveyor arm to rotate.

A second embodiment of the present invention is described hereafter and is referenced in FIGS. 14–18. In the second embodiment, the inflow channel 250, outflow channel 252 and decanted liquid exit channel 254 are all substantially the same structure as in the previous embodiment. In addition, the catch basin 256, frame 258, and primary conveyor rod 260 are also substantially the same as the previously described embodiment.

Figure 14:
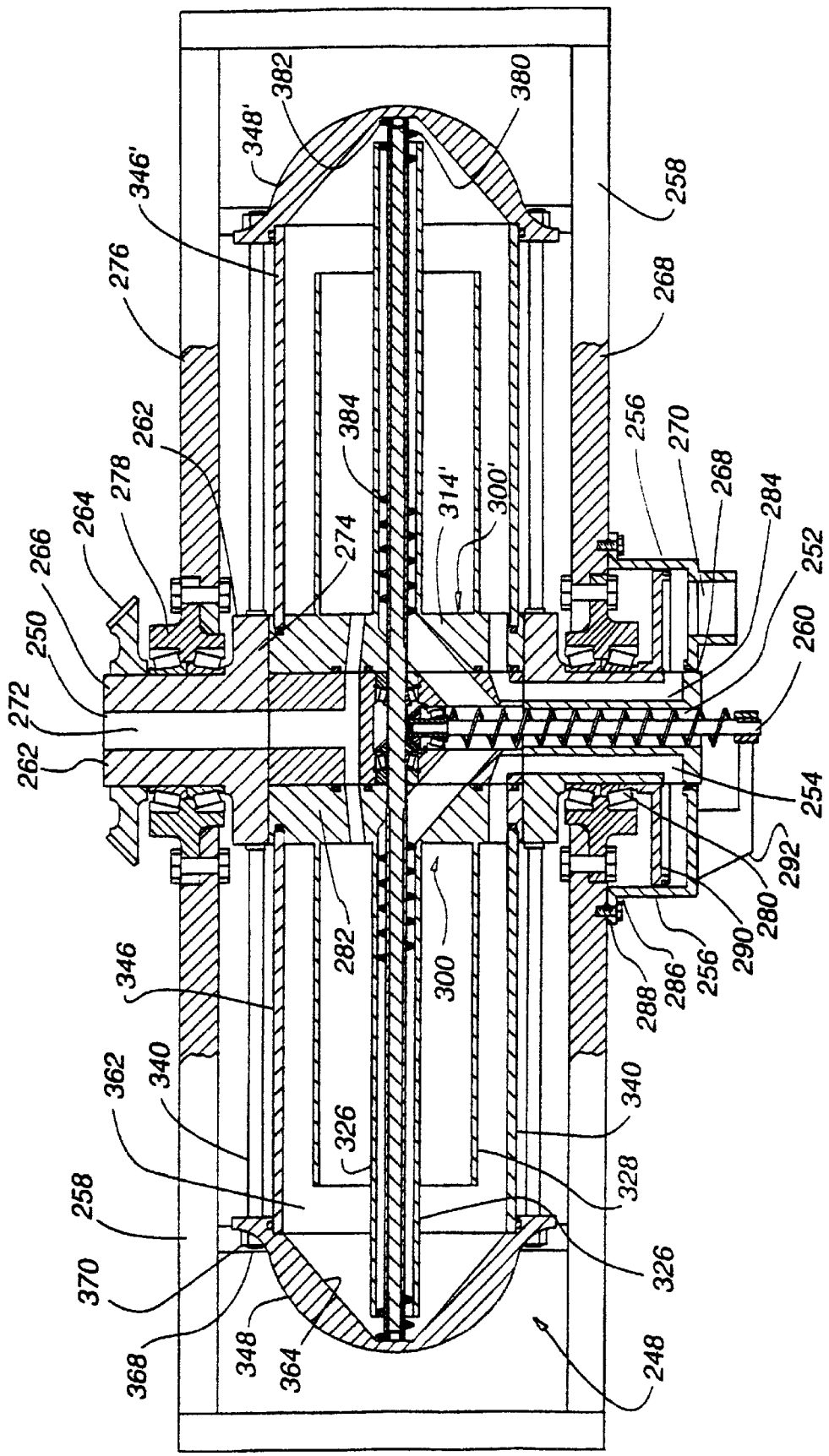
FIG. 14 is a partial section of a second embodiment of the present invention.

Referring now to FIG. 14, the center main shaft 262 is journaled in the frame 258 for relatively free rotary movement and relatively fixed vertical and lateral positioning. A drive means 264, such as a beveled ring gear drive, is attached to the top 266 of the center main shaft 262 for engagement with a complementary drive motor of any known suitable type. A drive motor (not shown) is positioned adjacent the drive means 264, in this case the beveled ring gear drive, to engage the drive means to rotate the vertical main shaft 262 about the vertical axis. The bottom end 268 of the center main shaft 262 is surrounded by a decanted fluid catch basin 256 defining a fluid outlet 270, as further described below.

Still referring to FIG. 14, the center main shaft 262 is preferably a unitary metal body having a central laterally extending cylindrical body portion 272 with opposing top 266 and bottom 268 cylindrical extensions. The axially oriented cylindrical bore 272 is formed through the top 266 and bottom 268 cylindrical portions of the center main shaft 262 and communicates with the centrally located chamber 274.

The drive means 264, in this case a beveled ring gear drive, mounts around the upper end of the top 266 cylindrical portion of the center main shaft 262. An upper portion 276 of the frame rotationally engages the top 266 cylindrical portion of the center main shaft 262 by way of a bearing means 278, such as tapered roller bearings, to facilitate the support and rotation of the housing within the frame 258. The bottom cylindrical portion 268 of the center main shaft 262 is rotationally journaled in the frame by bearing means 280 similar to the bearing means which rotationally journal the top cylindrical portion. The centrally positioned chamber 274 of the center main shaft 262 receives the transfer manifold 282, which is described in greater detail below. The liquid exit channel 254 is formed in part through the bottom cylindrical portion 268 of the center main shaft 262, which communicates with the centrally positioned chamber 274, and forms a radially extending aperture 284 adjacent the bottom end of the bottom cylindrical portion 268. A second identical channel 254 is formed in part in the bottom cylindrical extension 268 opposite the first channel. These two channels form part of the decanted liquid exit path 254 defined further below.

A catch basin 256, which acts as a decanted fluid reservoir and part of the drain channel 254, attaches to the frame 258 and forms an annular fluid collector about the bottom cylindrical extension 268, and sealingly engages the bottom cylindrical extension adjacent to but below the aperture 284. A fluid outlet port 270 is formed in the floor of the catch basin 256 to allow drainage of the decanted fluid. The catch basin 256 has a circular tub shape defining a rim 286, from which extends an annular flange 288. The catch basin 256 is attached to the frame 258 by any known means, such as bolts attached through the flange to the frame. A catch basin lid 290 is attached in fixed engagement with the bottom cylindrical portion 268 of the center main shaft 262 and defines a perimeter which sealingly engages the sidewalls of the catch basin 256. As the centrifuge 248 rotates within the frame 258, the catch basin 256 remains stationary while the bottom cylindrical portion 268 of the center main shaft 262 rotates, and with which the catch basin lid 290 also rotates in sealing engagement with the walls of the catch basin 256.

A conveyor screw bracket 292 is fixed to the bottom of the catch basin 256 and extends to a central position aligned with the axial bore 272 formed through the center main shaft 262 for fixedly receiving an end of the main or primary screw.

Figure 15:
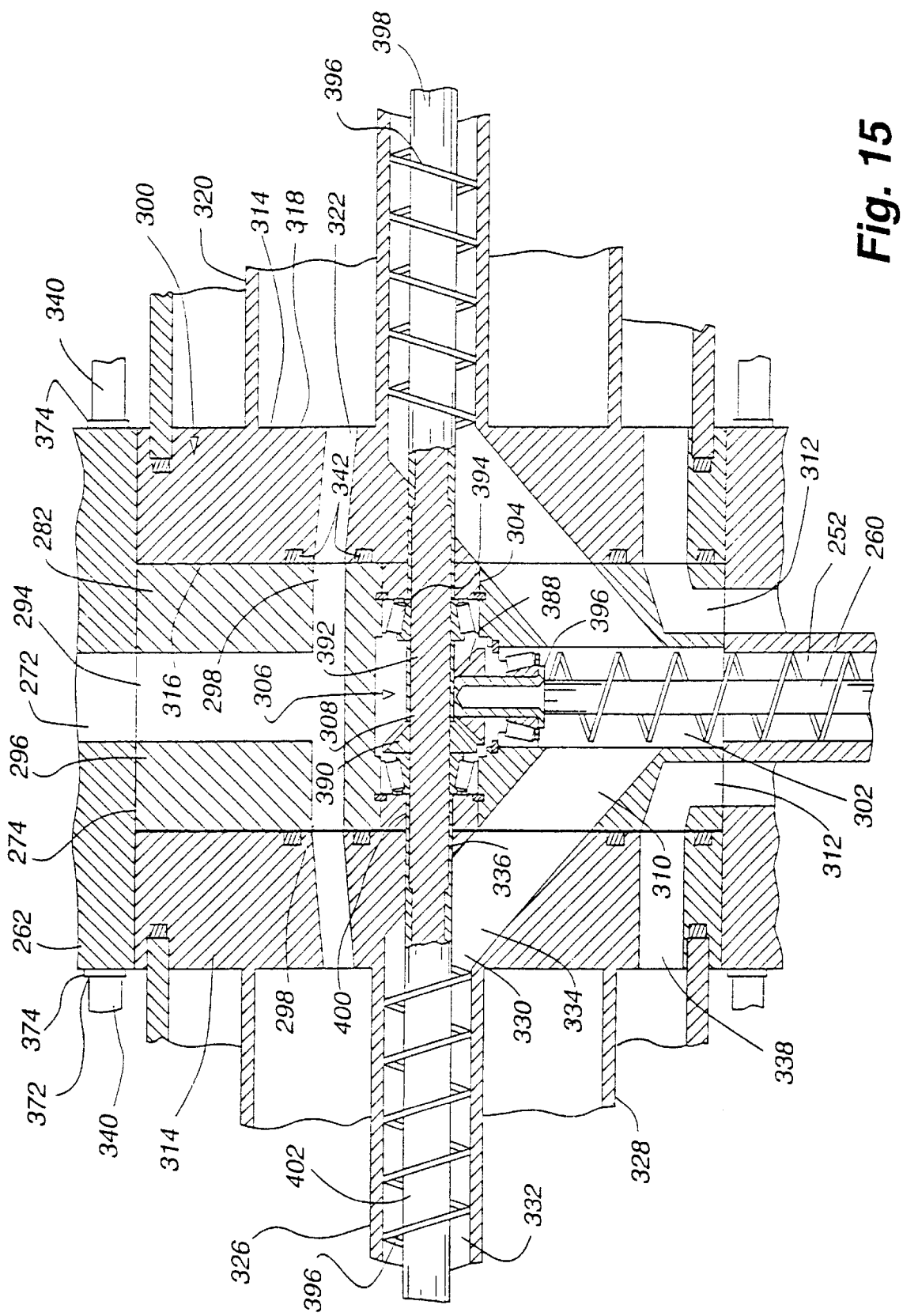
FIG. 15 is an enlarged section of the central portion of the second embodiment.

Referring to FIGS. 14 and 15, the fluid transfer manifold is shown. The fluid transfer manifold 282 has a cylindrical main body which is sized to fit the cylindrically shaped chamber 274 of the center main shaft 262. The fluid transfer manifold 282 defines a first axial bore 294 formed through a top portion 296 of the manifold 282 and terminates therein, in addition to defining opposing and laterally extending side bores 298 in communication with the axial bore 294. The side bores 298 extend through the opposing sidewalls to act in fluid communication with the baffle 300. The first axial bore 294 and the associated side bores 298 form a portion of the incoming flow path 250. A second axially aligned central bore 302 extends from the bottom surface of the manifold 282 through the central portion of the manifold and terminates prior to joining the first axial bore 294. The top end of the second axial bore 302 communicates with the opposing laterally extending bores 304 for receiving a motion transfer means, such as a gear and bearing box 306, used to drive the conveyor screw arm 308 off the main conveyor screw arm 260, as is described in greater detail below. A pair of angled bores 310 are formed each through a sidewall of the manifold 282 and extend in an angle downwardly to communicate with the second axial bore 302. The angled bores 310 form a portion of the exit flow path 252. A pair of drain channels 312, each having an L-shape are also formed in the manifold 282, with each channel 312 extending from the sidewall to the bottom of the manifold 282 for use in draining the decanted liquid from the arm housings.

Figure 18:
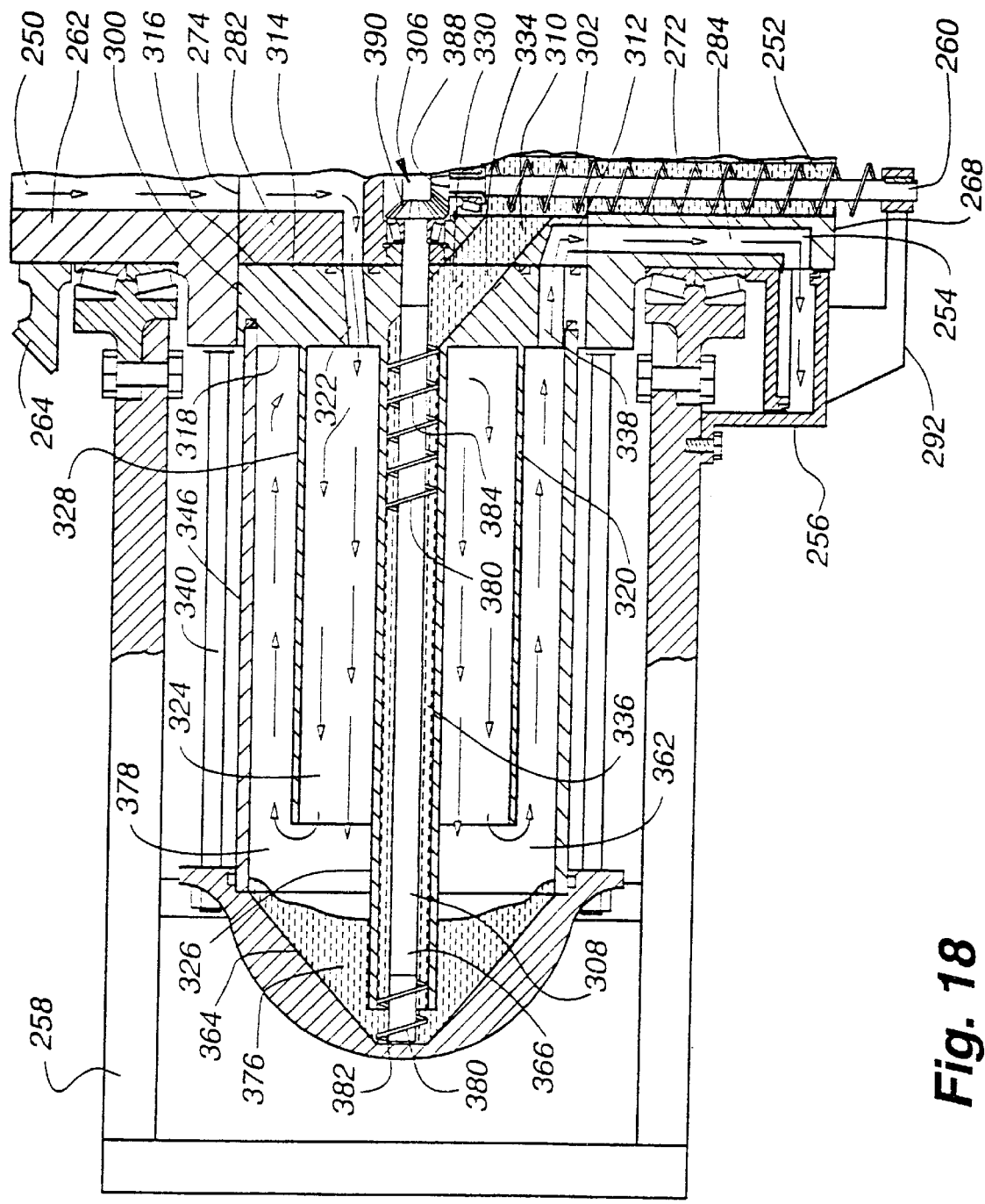
FIG. 18 is an enlarged partial section of an arm of the second embodiment representing the various flow patterns through the arm.

Referring to FIGS. 14, 15 and 18, the baffle 300 includes a base 314 having a first side surface 316 and a second side 318 surface and a plurality of concentric cylindrical tubes 320 attached to the second side surface and extending perpendicularly therefrom. The base 314 of the baffle 300 is partially inserted into the centrally positioned chamber 274 in the center main shaft 262, and extends laterally from each side of the manifold 282. A first channel 322 is formed through the base member 314 from the second side 318 to the first side 316, and communicates with the gap space 324 between the inner 326 and outer 328 cylindrical tubes attached to the base 314. This channel 322 forms part of the incoming flow path 250. A forked channel 330 is formed through the base 314 and communicates with the longitudinal channel 332 defined by the inner tube 326, with one fork 334 oriented at an angle downwardly, and the other fork 336 extending in an axial orientation through the base member 314. A third channel 338 is formed through the base member 314 and is external to the outermost tube 328. Both the inner 326 and outer 328 cylindrical tubes are sealed entirely about the circumference of the end attached to the base member 314. The baffle 300 is preferably made of a lightweight material that is corrosive-resistant and relatively strong, such as plastic.

The base member 314 has a circular shape defining a circumference which is concentrically spaced from the outermost tube 328 of the baffle 300. The base member 314 is positioned in the central chamber 274 of the main shaft 262 such that the first side 316 of the base member 314 is adjacent to and engages the fluid transfer manifold 282, as is shown in FIGS. 14 and 15. The baffle 300 is held in this position by a clamping force provided by the through-bolts 340 used to connect the entire assembly, as described further below. As shown in FIGS. 14 and 15, the first channel 322 formed through the base member 314 is aligned with the radially extending channel 298 formed in the manifold 282, which in turn communicates with the first axial bore 294 formed in the manifold 282, and continues in communication with the axial bore 272 in the upper cylindrical extension 266 of the center main shaft 272, and thus forms the inlet flow path 250.

The angled bore 334 in the base member 314 is aligned and fluidly communicates with the angled bore 310 of the manifold 282, and continues in fluid communication with the second central bore 302 formed in the manifold 282, which is in turn aligned with the axial bore 272 through the lower cylindrical extension 268 of the center main shaft 262. The channel 336 located in an axial position with the respect to the innermost tube 326 is aligned with the channel 302 which houses the transfer means 306 in the manifold. This series of channels forms the outlet flow path 252. The third channel 338 formed through the base member 314 outside the outermost tube 328 is aligned with the L-shaped channel 312 formed in the manifold 282, which is in turn aligned with the decanted liquid drain channel 284 formed in the lower cylindrical extension 268 of the center main shaft 262. This series of channels forms the decanted water flow exit path 254. The channels and bores aligned between and communicating through the base member 314 and the manifold 282 are separated by seals 342, such as by O-rings, at the interface between the base member 314 and the manifold 282.

Figure 17:
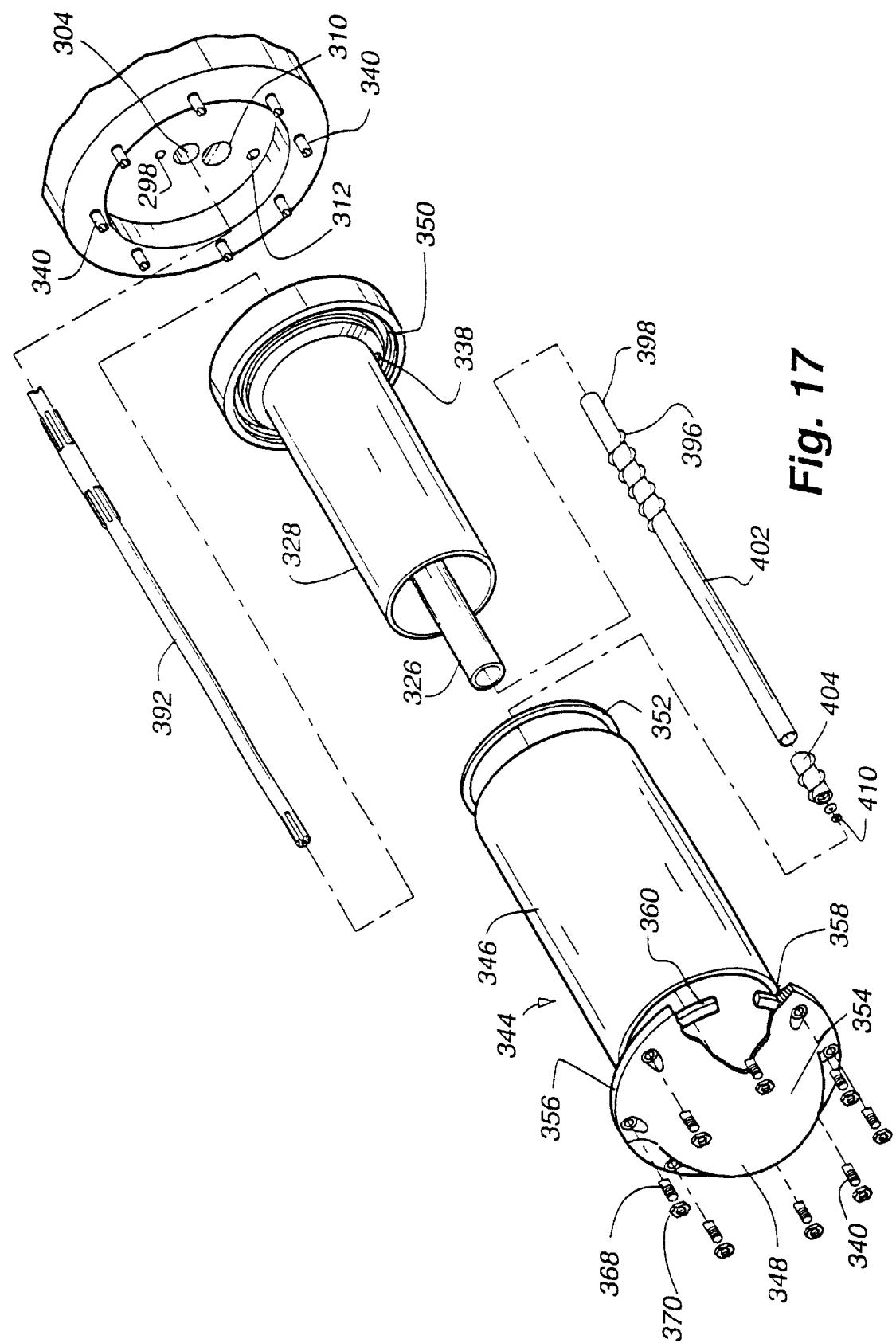
FIG. 17 is an exploded view of one arm of the second embodiment.

As shown in FIGS. 17 and 18, the arm housing 344 includes a main body 346 having a hollow cylindrical outer wall, and the bell cap 348. A first end of the hollow cylindrical outer wall engages a correspondingly formed groove 350 in the base 314 for sealing engagement therein, such as with an O-ring 352.

The bell cap 348 has a substantially hemispherical outer surface 354 forming a flange 356 about the large circumference of the bell cap. The second end of the outer wall 346 is received in a groove 358 formed on the inner periphery of the extending annular flange 356 of the bell cap 348 and is sealingly engaged therewith, such as by an O-ring 360. The combination of the outer wall 346 and the bell cap 348 form the arm housing 344 which defines an interior cavity 362. The bell cap 348 is substantially hemispherical in shape, and could define concentric grooves formed on its outer surface to save weight. The interior surfaces 364 of the bell cap 348 form a frustoconical cone shape with linearly sloped sides and a truncated end for receiving and guiding the residual compacted solids to the end 366 of the screw arm 308, which is further described herein below. The interior surfaces of the bell cap, here and in the first embodiment, are shaped to exceed the angle of repose for the solid material, as measured from the vertical. This will allow the solid material to more easily move toward the center tube. This angle may need to be adjusted depending on the type of solids that form the plug.

The opposite arm of the centrifuge is similarly formed as described above. The bell caps 348, 348', outer walls 346, 346', baffles 300, 300', and manifold 382, are held in position by a plurality of through-bolts 340 which extend from the flange of one bell cap 348 through the center main shaft 282 and through the flange of the opposing bell cap 348. The through-bolts 340 have externally threaded opposing ends 368 for receiving fasteners, such as nuts 370, for maintaining the bell cap 348, 348', outer wall 346, 346', baffles 300, 300' and fluid transfer manifold 282 in position on the center main shaft 262. The nuts 370 are threaded onto the opposite ends 368 of the through-bolts 340 to draw the bell caps 348 towards the center main shaft 262.

As shown in FIGS. 15 and 17, there are approximately eight through-bolts 340 evenly spaced around the circumference of the annular flange on the bell cap 348. The through-bolts 340 do not interfere with the internal chambers and passageways defined in the center main shaft 262. Each through-bolt 340 defines a groove 372 for receiving a snap ring 374 adjacent to the outer sides of the center main shaft 262 to fixedly position the through-bolt 340 in the center main shaft 262. The fixed positioning of the through-bolts 340 by the snap rings 374 keep the through-bolts from moving laterally with respect to the center main shaft 262, and allows the nuts 370 to be removed at either end of the through-bolts 340 without affecting the alignment of the structure on the opposing side.

As shown in FIG. 18, the input 250 and output 252 flow paths are substantially identical to those described above with respect to the first embodiment. The sludge is introduced through the inlet-flow path 250 to enter the cavity 362 of the centrifuge arm between the inner tube 326 and the outer tube 328 of the baffle 300. The introduction of the sludge occurs while the centrifuge is rotating about its vertical axis, which places the sludge under the effects of centrifugal force. This in turn then forces the sludge through the input channel 250 and into the gap 324 between the first 326 and second 328 tubes. In steady state operation (i.e., where the centrifuge of the present invention is running at operating speed after any start up) a plug 376 of compacted solids or heavy materials is formed at the distal end of the cavity 362 in each arm.

As the sludge flows through the gap 324 between the inner 326 and outer 328 tubes, and passes the end of the shorter outer tube, the fluid impacts the plug or the bell cap and is forced into the gap 378 between the outer tube 328 and outer wall 346 to flow back towards the center main shaft 262. As the fluid flows towards the center main shaft 262, it drains down around the outer tube 328 to the outlet channel 338, while the majority of the solids are compacted against the inner surface 364 of the bell cap 348. The fluid flows back towards the center main shaft 262 between the outer tube 328 and the outer wall 346.

Since the second tube 328 is cylindrical in shape, the decanted fluid will flow into the fluid outlet channel 338 from anywhere in the volume gap 378 between the outer tube 328 and the outer wall 346. The outlet channel can be formed identically as described above with respect to the first embodiment.

As the sludge flows through the passageways in the baffle 300, the solids (heavier material) are continuously forced to the distal end of the arm and form the plug 376 on the interior wall 364 of the bell cap 348. The solids, or heavy material, forming the plug are forced by the combination of centrifugal force and the hydrostatic head of the overlying liquids and solids to the apex of the bell cap 348, and into the center tube 326, and part of the way back towards the center main shaft 262. The solids then flow to the center main shaft 262 through the center tube 326 to the outlet channel 252 for the solids.

The outlet channel 252 for the solids is formed by the angled bore 334 formed through the base member 314 of the baffle 300, in communication with the angled bore 310 formed through the manifold 282, which communicates with the second axial bore 302 formed in the lower end of the manifold 282, which in turn communicates with the axial bore 292 formed through the lower cylindrical extension 268 of the center main shaft 262. The exit channel 252 for the solids terminates at the bottom of the center main shaft 262.

To assist in moving the solids along the exit path, a conveyor screw system is utilized. An arm conveyor screw 308 is positioned through the innermost tube 326 with flighting 380 positioned at the distal end 382 and at the end proximate 384 the base member of the baffle 300, with no flighting along the majority of the length of the arm conveyor screw 308. The flighting need not be tightly toleranced to the dimension of the inner tube 326. There is one arm conveyor screw extending through the arms of the centrifuge. The arm conveyor screw 308 is actuated by the movement of the centrifuge rotating about the vertical axis, as described further below, to move the sludge towards the center main shaft 262. The solids are forced through the angle portion of the exit path 252 by the positive pressure on the solids from the flighting 380 of the arm conveyor screw 308, and the vacuum pressure created by the movement of the solids along the main shaft conveyor screw 260. The vertically oriented main conveyor screw 260 is positioned in the axial bore formed through the center main shaft in conjunction with the manifold 262. The main conveyor screw 260 is also actuated by the movement of the rotation of the centrifuge about its vertical axis, and draws the sludge material downwardly to the exit port.

A conveyor screw bracket extends from the base of the catch basin 256 and is attached to the end of the main conveyor screw 260. The main conveyor screw has flighting along its entire length. The main conveyor screw is thus fixed in position to the frame and does not rotate itself. The conveyor screw is made to move relative to the centrifuge due to the rotation of the centrifuge. The conveyor screw bracket holds the end of the main conveyor screw such that when the centrifuge rotates about its vertical axis, the flighting on the main conveyor screw causes the solid material to move along the exit channel to be forced downwardly towards the exit portal.

The arm conveyor screw 308 is driven from the main conveyor screw 260 by the transfer means, such as the gear box 306, as shown in FIGS. 14 and 15. Preferably, the top of the main conveyor screw 260 defines a beveled gear. The gear box 306 comprises a master beveled gear 388 (on the primary conveyor screw 260) and a slave beveled gear 390 mounted on the conveyor rod 392 extending continuously through both arms. The rotation about the vertical axis of the master beveled gear 388 translates into rotation about the horizontal axis of the slave beveled gear 390. The slave beveled gear 390 is attached to the conveyor rod 392. The rod 392 is supported by journal bearings 394, which also act as thrust bearings, held in place by snap rings in the manifold 282. The master gear 388 is attached to a shank 396 supported by journal bearings in the gear box 306. The journal bearings supporting the shank 396 are held in place by the annular collar at the end of the shank, and the snap rings.

The conveyor rod 392 extends continuously from the distal end of one centrifuge arm through the base 314 of the baffle 300, through the fluid transfer manifold 282, through the base 314' of the opposing baffle 300', and to the end of the opposing centrifuge arm. The rod 392 is sized and positioned to not engage the bell cap 348 at either of its ends.

The conveyor rod 392 is rotated by the interaction between the drive bevel gear 388 and the slave bevel gear 390 inside the gear box 306. The conveyor rod 392 is supported by the journal bearings as described earlier to allow rotation about its longitudinal axis. The flighting 396 for moving the sludge through the inner tube 326 along the sludge exit flow path 252 is formed on an elongated flighting tube 398 which mounts over the conveyor rod 392. The tube 398 is attached to the conveyor rod 392 in a fixed relationship such that the tube rotates with the conveyor rod 392.

One manner of fixing the flighting tube 398 to the conveyor rod 392 is by a splined interconnection. As shown in FIG. 15, the inner end 400 of the flighting tube 398 defines female splines, and the outer surface of the conveyor rod 398 defines male splines such that when the female splines and the male splines are interconnected as the flighting tube is slid over the conveyor rod 392, a torque transmitting relationship is formed. Thus, when the rod 392 turns, the flighting tube 398 turns, with the flighting mounted such that it propels the solids or heavy material along the exit path. A second flighting tube 398' is mounted along the opposite length of the conveyor rod 392 in the other arm of the centrifuge.

The flighting 396 does not have to be closely sized to the inside of the first tube 326. However, a sleeve may be positioned on the inside of the first tube 326 to receive any wear from the flighting 396 if the flighting is tightly toleranced to the inside of the sleeve such that the inner tube 326 is not worn or degraded by the movement of the flighting tube 398 during operation.

Figure 16:
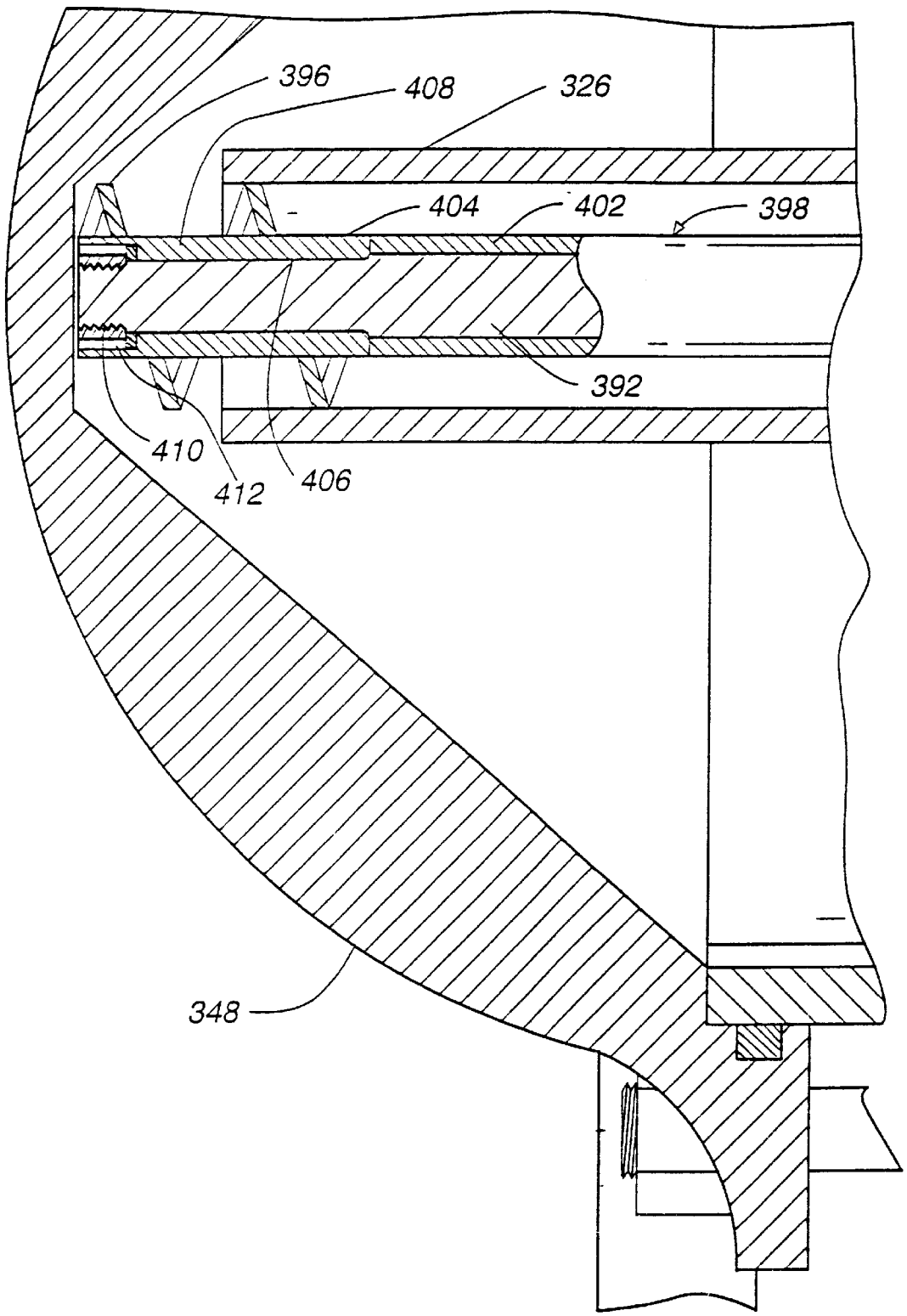
FIG. 16 is an enlarged section of the bell cap and end of the conveyor arm of the second embodiment.

The flighting tube 398 comes in two lengths, the first length 402 being positioned along the majority of the length of the conveyor rod 392 from adjacent the gear box 306 outwardly towards each end of the conveyor rod 392. As shown in FIG. 16, a small length 404 of flighting tube 398 is separately positioned on the conveyor rod 392 in a splined relationship with the conveyor rod 392 to provide a torque transferring relationship between the outer end flighting tube 404 and the conveyor rod 392. Preferably, the outer end of the conveyor rod 392 has female spline grooves 406 formed therein, and the outer end flighting tube 404 has male splines 408 formed therein to form a spline engagement when the outer end flighting tube 404 is inserted over the outer end of the conveyor rod 392. The outer end flighting tube 404 assists in the initial movement of the heavy materials into the exit flow path 252, and is subject to a great amount of wear due to the compaction of the heavy materials at this location. The outer end flighting tube 404 is made to be easily removed and replaced such that the entire flighting tube 398 does not need to be replaced when only the outer end flighting tube 404 requires maintenance.

The outer end flighting tube 404 and the primary flighting tube 402 are held on the conveyor rod 392 by a fastener 410, such as a nut and washer combination. The outer end of the conveyor rod 392, on each end, is externally threaded. A countersunk cavity 412 is formed in the distal end of the outer flighting tube 404 to allow a washer and a nut to be threaded over the end of the conveyor rod 392. The washer and the nut engage a shoulder formed by the countersunk hole 412 of the outer end flighting tube 404 to urge the outer end flighting tube 404 towards the main shaft 262, which in turn engages the end of the primary flighting tube 402 and urges the primary flighting tube 402 towards the center main shaft 262 to hold the two flighting tubes in place. The outer flighting tube 404 is replaced simply by unscrewing the nut 370, removing the washer, removing the outer end flighting tube 404 and replacing the outer end flighting tube and refastening it thereon.

It should be noted that since the conveyor rod 392 in the second embodiment is continuous and rotates in one direction, the flightings in the opposing centrifuge arms are opposite one another to draw the solid or heavier materials along the respective exit flow paths.

The equilibrium between the travel of solids down the center tube 326 along the exit path and the size of the plug is similar in this embodiment as described above with respect to the first embodiment.

The second embodiment of the centrifuge of the present invention includes a simplified construction, and a shorter flow path and resulting residence time under the centrifugal force. An entire arm of the centrifuge can be accessed for maintenance or replacement by simply removing the nuts 370 on the outer end of the through-bolts 368 which initially release the bell cap 348. The outer flighting tube 404 can then be removed for replacement or to continue the disassembly of the centrifuge arm. After removing the outer flighting tube 404 by removal of the nut and washer from the end of the conveyor rod 392, the primary flighting tube 402 can be removed by sliding the primary flighting tube outwardly along the conveyor rod 392 to disengage the spline connection between the primary flighting tube 402 and the conveyor rod 392 near the gear box 306.

At this point the outer wall 346 can also be removed (after the bell cap 348 is removed). The baffle 300 can then be removed after the primary flighting tube 402 has been removed. The baffle 300 can be replaced with a baffle having more tubes to increase the length of the flow path and the residence time, with the appropriate adjustments made to the attachment of the additional tubes to the base 314 of the baffle 300, and to the length of the tubes. After the baffle 300 has been removed, the conveyor rod 392 can be withdrawn from the center main shaft 262 by removing the other bell cap 348' (the through rods 368 can simply be pulled from the center main shaft 262 without removing the bell cap 348 from the through rods after the snap-rings 374 have been removed), removing the baffle 300, and disengaging the primary conveyor shaft 260 from the drive beveled gear.

There are several benefits gained in the use of the centrifuge of the present invention. The concentric tubular design of the baffle provides an extremely long residence time during which the sludge is under the separating forces. The longer the residence time, the more heavy waste materials are removed from the liquid. In addition, the solids are deliquefied by means of compaction. The centrifuge is easily disassembled for maintenance, part replacement, or performance modification. The centrifuge of the present invention can generate tremendous centrifugal force in a relatively small machine, is portable, and can be easily adjusted to handle the desired type of input material and flow rate.

While the invention has been particularly shown and described with reference to preferred embodiments thereof, it will be understood by those skilled in the art that various other changes in the form and details may be made without departing from the spirit and scope of the invention.

A presently preferred embodiment of the present invention and many of its improvements have been described with a degree of particularity. It should be understood that this description has been made by way of example, and that the invention is defined by the scope of the following claims.

What is claimed is:

1. A centrifuge for decanting lighter material from heavier material from a mixture of initial material, the centrifuge comprising:

a housing including a central body, said central body defining an axis;

a hollow arm extending from said central body, said arm including a first end attached to said central body, and a second end extending away from said central body, said hollow arm defining a chamber, said chamber including an inner portion and an outer portion;

a baffle attached to said central body and extending into said chamber, said baffle defining concentric tube walls where said concentric tube walls become progressively shorter from said inner portion of said chamber to said outer portion of said chamber, said baffle defining a flow path between said concentric tube walls within said chamber;

said flow path including a first exit path for guiding said lighter material out of said housing and a second exit path for guiding said heavier material through said housing; and an entrance path for receiving the mixture of initial material, said entrance path formed in said housing and communicating with said flow path.

2. The centrifuge of claim 1, further comprising:

a top collar and a bottom collar; and a frame supporting said housing for rotation of said arm within said frame, said frame coupled to said housing at said top collar and at said bottom collar.

3. The centrifuge of claim 2, further comprising:

a bearing engaging said top collar between said frame and said housing.

4. The centrifuge of claim 1, further comprising:

a drive motor for providing rotational motion; and a ring gear coupled to said housing for engagement with said drive motor, said ring gear adapted to convert rotational motion of said drive motor to rotations of said housing within said frame.

5. A method for separating lighter material from heavier material from a mixture of initial material, the method comprising the steps of:

providing a rotatable centrifuge including at least two opposing arms rotatable about an axis, each arm including a distal end relative to said axis;

defining a flow path between concentric tube walls within said centrifuge, said flow path in fluid communication with a fluid exit path for lighter material;

providing for introducing said initial material into said centrifuge;

rotating said centrifuge about said axis to apply a centrifugal force on said initial material;

providing for forming plugs at the distal ends of said arms, said plugs formed of the heavier material as the centrifuge rotates;

providing an interior tube with each of said arms, said interior tube adapted to engage said plugs and providing a solid exit pathway for the heavier material; and removing portions of said plugs from said arms through the interior tube at rate proportional to a rotation rate established by said rotating step.

6. A centrifuge for decanting lighter material from heavier material from a mixture of initial material, the centrifuge comprising:

a housing including a central body, said central body defining an axis;

a hollow arm extending from said central body, said arm including a first end attached to said central body, and a second end extending away from said central body, said hollow arm defining a chamber;

a baffle attached to said central body and extending into said chamber, said baffle defining an inner radial location and an outer radial location in said chamber;

a flow path defined by said baffle that enters said chamber at said inner radial location and exits said chamber at said outer radial location, said flow path including a first exit path for guiding said lighter material out of said housing and a second exit path for guiding said heavier material through said housing; and an entrance path for receiving the mixture of initial material, said entrance path formed in said housing and communicating with said flow path.

* * * * *

(12) EX PARTE REEXAMINATION CERTIFICATE (5520th)
United States Patent
Cornay

(10) Number: US 6,142,924 C1
(45) Certificate Issued: *Sep. 19, 2006

(54) CONCENTRIC TUBULAR CENTRIFUGE

(75) Inventor: Paul J. Cornay, Longmont, CO (US)

(73) Assignee: Erth Technologies, Inc., Longmont, CO (US)

Reexamination Request:
No. 90/007,031, May 4, 2004

Reexamination Certificate for:
Patent No.: 6,142,924
Issued: Nov. 7, 2000
Appl. No.: 09/298,272
Filed: Apr. 23, 1999

(*) Notice: This patent is subject to a terminal disclaimer.

Related U.S. Application Data

(63) Continuation of application No. 08/950,377, filed on Oct. 14, 1997, now Pat. No. 5,944,648.
(60) Provisional application No. 60/028,556, filed on Oct. 15, 1996.

(51) Int. Cl.
*B04B 5/02* (2006.01)
*B04B 11/00* (2006.01)

(52) U.S. Cl. .............................. 494/33; 494/37; 494/51
(58) Field of Classification Search .................. 494/37, 494/22, 31, 33, 43, 44, 50, 51, 52, 53, 54, 494/55, 56, 76, 77, 78, 84, 85; 210/294, 319, 210/322
See application file for complete search history.

(56) References Cited

U.S. PATENT DOCUMENTS

| | | |
|---|---|---|
| 2,185,279 A | 1/1940 | Strezynski |
| 3,685,721 A | 8/1972 | Kohama |
| 3,837,491 A | 9/1974 | Humiston et al. |
| 4,108,763 A | 8/1978 | Clough |
| 4,369,115 A | 1/1983 | Bauer |
| 4,500,324 A | 2/1985 | Vuong |

(Continued)

FOREIGN PATENT DOCUMENTS

| | | |
|---|---|---|
| EP | 0545683 | 7/1996 |
| EP | 0928227 | 1/2003 |
| GB | 1526129 | 9/1978 |

(Continued)

OTHER PUBLICATIONS

Investor brochure, Paul J. Cornay, "G–Force corp.," 1988.
Sharples MaxiMizer XM: For Thickening Without Polymer, 1 page, at least as early as Jun. 1997.
Brochure: CARR Separations, Inc., CARR Powerfuge Separation System, P24, 2 pages, at least as early as Jan. 14, 1997.
Brochure: CARR Powerfuge Separation System, Pilot, 2 pages, at least as early as Jan. 14, 1997.

(Continued)

*Primary Examiner*—David A Reifsnyder

(57) ABSTRACT

A centrifuge for decanting lighter material from heavier material from a mixture of initial material includes a housing having a central body and a hollow arm extending from the body, the arm having a first end attached to the central body, and a second end extending away from the central body, and an end cap attached to the second end of the arm to form a chamber in the arm. A baffle is attached to the body and extends into the chamber, the baffle having a longer inner tube having an interior and a distal end, and a shorter outer tube. The longer tube is positioned inside the shorter tube and defines an inner space therebetween. An outer space is defined between the shorter tube and the hollow arm. An entrance path for the mixture of initial material is formed in the housing and communicates with the inner space. An exit path for the light material is formed in the housing and communicates with the outer space. An exit path for the heavier material is formed in the housing and includes the interior of the longer tube. A plug is formed in the chamber adjacent the end cap to engage the distal end of the longer tube and define a flow path to guide the lighter material to the light material exit path.

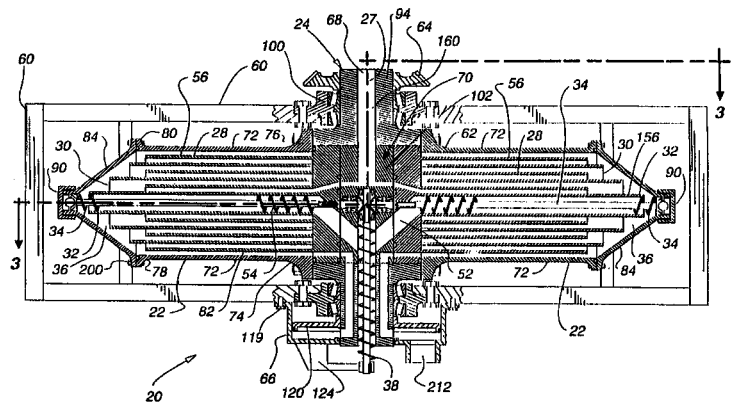

U.S. PATENT DOCUMENTS

| | | | |
|---|---|---|---|
| 4,618,478 | A | 10/1986 | McKinney |
| 4,648,863 | A | 3/1987 | Nees |
| 4,673,510 | A | 6/1987 | Janusch et al. |
| 4,911,738 | A | 3/1990 | Schneider |
| 5,045,202 | A | 9/1991 | Stearns et al. |
| 5,132,025 | A | 7/1992 | Hays |
| 5,240,619 | A | 8/1993 | Copa et al. |
| 5,252,224 | A | 10/1993 | Modell et al. |
| 5,372,725 | A | 12/1994 | Halff et al. |
| 5,380,442 | A | 1/1995 | Yan |
| 5,425,883 | A | 6/1995 | Reid et al. |
| 5,462,676 | A | 10/1995 | Pitts |
| 5,470,481 | A | 11/1995 | Modell et al. |
| 5,500,120 | A | 3/1996 | Baker |
| 5,538,636 | A | 7/1996 | Gnann et al. |
| 5,620,606 | A | 4/1997 | McBrayer, Jr. et al. |
| 5,651,897 | A | 7/1997 | Lehmann |
| 5,688,377 | A | 11/1997 | McCutchen |
| 5,688,399 | A | 11/1997 | Halff et al. |
| 5,792,351 | A | 8/1998 | Wehrle et al. |
| 5,888,389 | A | 3/1999 | Griffith et al. |
| 5,928,522 | A | 7/1999 | Conaway |
| 5,997,812 | A | 12/1999 | Burnham et al. |
| 6,080,309 | A | 6/2000 | Reid et al. |
| 6,093,328 | A | 7/2000 | Santina |
| 6,142,924 | A | 11/2000 | Cornay |
| 6,217,502 | B1 | 4/2001 | Hallgren et al. |
| 6,251,290 | B1 | 6/2001 | Conaway |
| 6,309,338 | B1 | 10/2001 | Christensen |
| 6,508,752 | B1 | 1/2003 | Hallgren et al. |
| 6,808,481 | B1 | 10/2004 | Cornay |
| 2002/0032111 | A1 | 3/2002 | Cornay et al. |
| 2004/0142807 | A1 | 7/2004 | Cornay et al. |
| 2005/0054507 | A1 | 3/2005 | Cornay et al. |

FOREIGN PATENT DOCUMENTS

| | | |
|---|---|---|
| JP | 57004299 | 1/1982 |
| JP | 58034098 | 2/1983 |
| JP | 58095589 | 6/1983 |
| JP | 58205591 | 11/1983 |
| JP | 62007489 | 1/1987 |
| JP | 03293097 | 12/1991 |
| JP | 05068980 | 3/1993 |
| SE | 189162 | 4/1964 |
| WO | WO99/025497 | 5/1999 |
| WO | WO01/005498 | 1/2001 |

OTHER PUBLICATIONS

Brochure: Alfa–Laval, "Centrifuges for the Chemical Process Industries", 8 pages, 1978.

Alfa–Laval AB, "Waste Oil Recovery", 12 pages, date unknown.

Author Unknown, "Oiltools: Solids Control Equipment", 4 pages, date unknown.

Brochure: Alfa–Laval, "ALFAX self–cleaning centrifuge separators with controlled partial discharge—WHPX series", 2 pages, date unknown.

TRW, "Brandt Decanting Centrifuges", 5 pages, 1985.

Alfa–Laval, "When to use a disk–stack centrifuge", 19 pages, date unknown.

BROCHURE: Milchem's New RMS Model High Volume, 3 pages, date unknown.

Alfa–Laval, "Slop Oil Treatment Plant for Crude Oil Recovery", 8 pages, 1987.

Geosource, "Geograph Pioneer—Manual of Centrifuge Operation", date unknown.

Author Unknown, "Jet mixers for agitating large storage tanks," Chem. Eng (Int. Ed.), vol. 96, No. 1, p. 133, Jan. 16, 1989.

Butcher, C., "Liquid waste solutions," Chemical Engineer (Rugby–UK), No. 551, pp. s27, Oct. 14, 1993.

Min et al., "Advanced treatment of piggery wastewater by MAP, precipitation, and ozone oxidation process using pilot plant," Journal of Korea Solid Wastes Engineering Society, vol. 15, No. 6, pp. 644–652, Sep. 1998.

Sereno et al., "Dewatered sludge storage emissions control using multistage wet scrubbing," Water Environment Research, vol. 65, No. 1, pp. 66–72, 1993.

Theriault et al., "The effect of chemical, physical and enzymatic treatments on the dewatering of tar sands tailings," Fuel, vol. 74, No. 9, pp. 1404–1412, Sep. 1995.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-6 is confirmed.

* * * * *